United States Patent
Kaneko et al.

(10) Patent No.: US 6,933,994 B1
(45) Date of Patent: Aug. 23, 2005

(54) LIQUID CRYSTAL DISPLAY INCLUDING AN ANISOTROPIC SCATTERING LAYER

(75) Inventors: Yasushi Kaneko, Sayama (JP); Makoto Arai, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 108 days.

(21) Appl. No.: 09/889,852

(22) PCT Filed: Nov. 24, 2000

(86) PCT No.: PCT/JP00/08306

§ 371 (c)(1),
(2), (4) Date: Jul. 23, 2001

(87) PCT Pub. No.: WO01/38932

PCT Pub. Date: May 31, 2001

(30) Foreign Application Priority Data

Nov. 24, 1999 (JP) ............................................. 11-332127
Jun. 29, 2000 (JP) ....................................... 2000-195391

(51) Int. Cl.[7] ............................................. G02F 1/1335
(52) U.S. Cl. .......................... 349/112; 349/62; 349/113
(58) Field of Search ................................ 349/112, 113, 349/62

(56) References Cited

U.S. PATENT DOCUMENTS

| | | | | |
|---|---|---|---|---|
| 5,889,570 | A | | 3/1999 | Mitsui et al. ................ 349/113 |
| 6,122,027 | A | * | 9/2000 | Ogawa et al. ............... 349/113 |
| 6,424,395 | B1 | * | 7/2002 | Sato et al. ................... 349/112 |
| 6,559,909 | B1 | * | 5/2003 | Kushida et al. ................ 349/62 |

FOREIGN PATENT DOCUMENTS

| | | |
|---|---|---|
| EP | 0 470 817 A2 | 2/1992 |
| EP | 0 859 246 A1 | 8/1998 |
| EP | 0 886 169 A2 | 12/1998 |
| EP | 0 949 515 A2 | 10/1999 |
| JP | 04097121 | 3/1992 |
| JP | 08146417 | 6/1996 |
| JP | 09050026 | 2/1997 |
| JP | 10123505 | 5/1998 |
| JP | 10153772 | 6/1998 |
| JP | 11119215 * | 4/1999 |
| JP | 11-119215 A | 4/1999 |

* cited by examiner

*Primary Examiner*—Julie Ngo
(74) *Attorney, Agent, or Firm*—Finnegan, Henderson, Farabow, Garrett & Dunner, L.L.P.

(57) ABSTRACT

A liquid crystal display comprises a top polarizer 11, an optical compensating element, an anisotropic scattering layer 10, a scattering layer 7, and a liquid crystal device 20 incorporating therein a reflective layer 9. When the direction of viewing direction of the anisotropic scattering layer is designated as the Y-axis direction, and a direction oriented substantially at right angles to the Y-axis direction is designated as the X-axis direction, light entering the anisotropic scattering layer is scattered over a wider angle along the Y-axis direction than along the X-axis direction. Further, the incident angle dependence of the straight-go transmittance of the anisotropic scattering layer is symmetrical about the layer normal, and the straight-go transmittance in the layer normal direction is lower than the straight-go transmittance in any oblique direction.

8 Claims, 15 Drawing Sheets

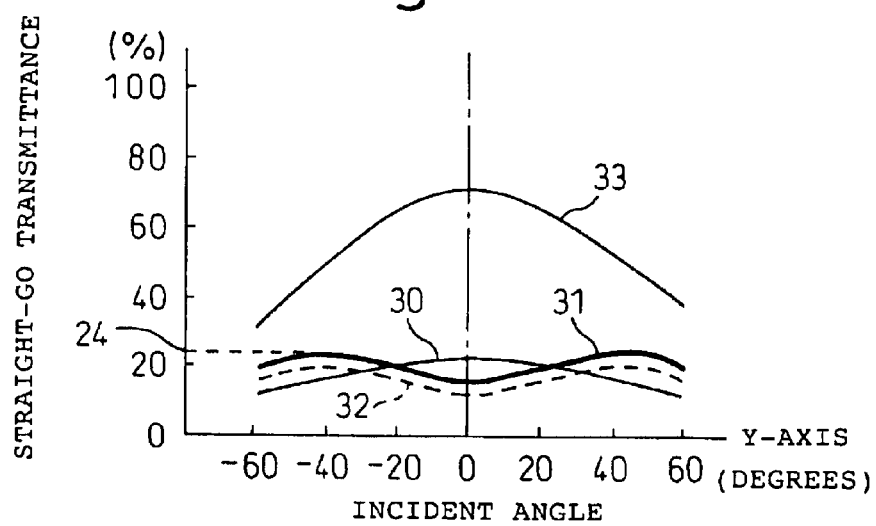

CROSS SECTION ALONG
Y-AXIS DIRECTION

CROSS SECTION ALONG
X-AXIS DIRECTION

LIQUID CRYSTAL DISPLAY INCLUDING AN ANISOTROPIC SCATTERING LAYER

TECHNICAL FIELD

The present invention relates to the construction of a liquid crystal display, and more particularly to a single-polarizer reflective liquid crystal display which achieves a bright black and white or color display using a single polarizer and a internal reflector in a liquid crystal display device.

BACKGROUND ART

Conventionally, reflective liquid crystal displays have been constructed using a pair of polarizers, a reflective layer placed on the outside of one of the polarizers, and a TN (twisted nematic) or STN (super twisted nematic) liquid crystal device sandwiched between them. This configuration, however, has the problem that not only is the low brightness of the display, but shadows appear on the display because the reflective layer is placed outside the glass substrate.

To address this problem, there has been proposed a single-polarizer reflective liquid crystal display that can produce a display using a single polarizer. Since only one polarizer is used, the brightness can be improved compared with the conventional reflective liquid crystal display that uses two polarizers.

In the case of the single-polarizer liquid crystal display, the display shadow problem can also be solved by forming a reflective layer within the liquid crystal display device.

The single-polarizer liquid crystal display comprises a single polarizer, a single retardation film, and a liquid crystal device incorporating therein a reflective layer; this type of display is disclosed, for example, in Japanese Unexamined Patent Publication No. 4-97121. Another type of single-polarizer liquid crystal display has also been proposed which uses, instead of the retardation film, a compensation layer having a twisted structure whose twist direction is opposite to that of the liquid crystal layer; this type of display is disclosed, for example, in Japanese Unexamined Patent Publication No. 10-123505.

However, in the case of the single-polarizer liquid crystal display that uses a single polarizer and contains a reflective layer within the liquid crystal device, if the reflective layer is a specular reflector, since incident light is not reflected in any direction other than the specular direction, display brightness is reduced. To address this, in one method it has been practiced to roughen the reflective electrode in order to enhance display brightness in other directions than the specular direction, but the problem is that this requires a difficult manufacturing process.

To achieve a bright display with a simpler construction, a liquid crystal display has been developed that uses a specular reflector and that includes on the outside of the polarizer a scattering layer that exhibits large forward scattering but small back scattering; this type of display is disclosed, for example, in Japanese Unexamined Patent Publication No. 8-201802.

However, in the liquid crystal display provided with such a scattering layer, image blurring occurs if the degree of scattering of the scattering layer is raised to enhance brightness; as a result, it has not been possible to raise the degree of scattering satisfactorily, and there has been a need for a display with enhanced brightness.

To achieve a brighter display, a liquid crystal display has been developed that uses a specular reflector and that includes a plurality of scattering layers on the outside of the polarizer or between the liquid crystal device and the polarizer, the incident angle dependence of scattering of at least one of the scattering layers being made asymmetrical about the layer normal; this type of display is disclosed, for example, in Japanese Unexamined Patent Publication No. 11-119215.

With this liquid crystal display, since the degree of scattering is reduced in the viewing direction and increased in the incidence direction by using a scattering layer whose angle dependence of light scattering is asymmetrical about the layer normal, a bright display can be obtained while reducing image blurring to a relatively small level. However, increasing the degree of scattering in the incidence direction has had the disadvantage of reducing the contrast because the back scattering of the incident light increases. A further disadvantage has been that since the angular dependence of scattering of the incident light is large, the brightness changes abruptly, resulting in degradation of the viewing angle characteristic.

An object of the present invention is to solve the above-enumerated problems and provide a single-polarizer liquid crystal display that can achieve, with a relatively simple construction, a bright display with reduced image blurring over a wide viewing angle range.

DISCLOSURE OF THE INVENTION

To achieve the above object, according to the present invention, there is provided a liquid crystal display comprising a first substrate having a reflective layer and a first electrode, a second substrate having a second electrode, and a nematic liquid crystal material with twisted orientation sandwiched between the first and second substrates, wherein the liquid crystal display includes an anisotropic scattering layer which is provided nearer to a viewing side than to the reflective layer, and whose straight-go transmittance varies depending on the incident angle, and wherein when the direction of preferential viewing angle of the anisotropic scattering layer is designated as Y-axis direction, and a direction oriented substantially at right angles to the Y-axis direction is designated as X-axis direction, light entering the anisotropic scattering layer is scattered over a wider angle along the Y-axis direction than along the X-axis direction.

In one preferred mode of the invention, the straight-go transmittance of the anisotropic scattering layer has an angle dependence that is symmetrical about a layer normal direction, and the straight-go transmittance in the layer normal direction is lower than the straight-go transmittance in any oblique direction.

The invention is characterized by the provision of a scattering layer in addition to the anisotropic scattering layer. The invention is also characterized in that the nematic liquid crystal has a twisted structure whose twist angle lies within a range of 180° to 260°.

In another preferred mode of the invention, when the direction of preferential viewing angle of the anisotropic scattering layer is designated as the Y-axis direction, and a direction oriented substantially at right angles to the Y-axis direction is designated as the X-axis direction, the incidence angle dependence of the straight-go transmittance is symmetrical about the layer normal of the anisotropic scattering layer for both the X-axis direction and the Y-axis direction, the straight-go transmittance of the anisotropic scattering layer in the layer normal direction is lower than the straight-go transmittance thereof in any oblique direction, and the straight-go transmittance in oblique directions differs between the X-axis direction and the Y-axis direction.

The straight-go transmittance of the anisotropic scattering layer in oblique directions has a characteristic such that the straight-go transmittance is higher for light rays obliquely incident along the X-axis direction than for light rays obliquely incident along the Y-axis direction.

In another preferred mode of the invention, when the direction of preferential viewing angle of the anisotropic scattering layer is designated as the Y-axis direction, and a direction oriented substantially at right angles to the Y-axis direction is designated as the X-axis direction, the incidence angle dependence of the straight-go transmittance along the Y-axis direction is symmetrical about the layer normal of the anisotropic scattering layer, the straight-go transmittance in the layer normal direction of the anisotropic scattering layer being lower than the straight-go transmittance in any oblique direction, and the incidence angle dependence of the straight-go transmittance of the anisotropic scattering layer along the X-axis direction is asymmetrical about the layer normal of the anisotropic scattering layer.

In the above liquid crystal display, the reflective layer is formed as a transflective layer, at least one optical compensating element and a bottom polarizer are provided on the outside of the first substrate, and a backlight is provided on the outside of the bottom polarizer.

Further, a color filter consisting of a plurality of colors is provided on either one of the first and second substrates.

The optical compensating element is constructed using a retardation film or a twisted retardation film or both.

ADVANTAGEOUS EFFECT OF THE INVENTION

According to the present invention, in a single-polarizer liquid crystal display comprising a top polarizer, an optical compensating element, an anisotropic scattering layer, and a liquid crystal device incorporating therein a reflective layer, the anisotropic scattering layer is constructed so that light entering it is scattered over a wider angle along the preferential viewing angle direction (Y-axis direction) than along the direction (X-axis direction) oriented at right angles to the preferential viewing angle direction.

Further, the incident angle dependence of the straight-go transmittance of the anisotropic scattering layer is made symmetrical or asymmetrical about the layer normal direction along the X-axis direction, and also the straight-go transmittance in the layer normal direction is made lower than the straight-go transmittance in any oblique direction.

As a result, a bright and high-contrast display with a good viewing angle characteristic can be produced which uses ambient light.

Further, according to the present invention, by forming the reflective layer as a transflective layer, and by providing a backlight, a reflective display using ambient light and a transmissive display using the backlight can be achieved.

Furthermore, according to the present invention, by incorporating color filters in the liquid crystal device, a color display can be achieved.

BRIEF DESCRIPTION OF THE DRAWINGS

FIG. 3 is a graph showing the incidence angle dependencies of anisotropic scattering layers.

DETAILED DESCRIPTION OF THE INVENTION

Figure 1:
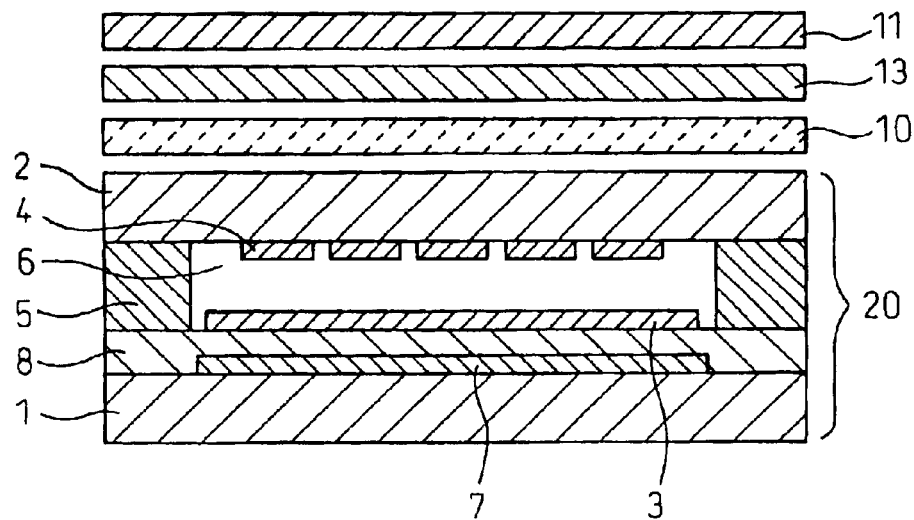
FIG. 1 is a cross-sectional view showing the configuration of a liquid crystal display according to the present invention.

The configuration and operation of a liquid crystal display in the best mode for carrying out the invention will be described below with reference to the accompanying drawings. FIG. 1 is a cross-sectional view for explaining the component elements of the liquid crystal display used in the present invention.

As shown in FIG. 1, the liquid crystal display of the present invention comprises a liquid crystal device 20, an anisotropic scattering layer 10 formed on the upper side of the liquid crystal device 20, that is, the side nearer to the viewer and opposite from the side where a reflector is provided, a retardation film 13 as an optical compensating element, and a top polarizer 11. The anisotropic scattering layer used in the liquid crystal display of the invention has the characteristic that the light entering it is scattered over a wider angle along the Y-axis direction than along the X-axis direction, where the Y-axis direction is the direction of the preferential viewing angle of the anisotropic scattering layer and the X-axis direction is a direction oriented substantially at right angles to the Y-axis direction. That is, the use of the anisotropic scattering layer 10 whose straight-go transmittance in the layer normal direction, where the incident angle is 0°, is lower than that in any oblique direction, constitutes a feature of the present invention.

The liquid crystal device 20 includes a first substrate 1, a second substrate 2, a first electrode array 3, a second electrode array 4, a seal member 5, a nematic liquid crystal 6, and a reflective layer 7.

Figure 2:
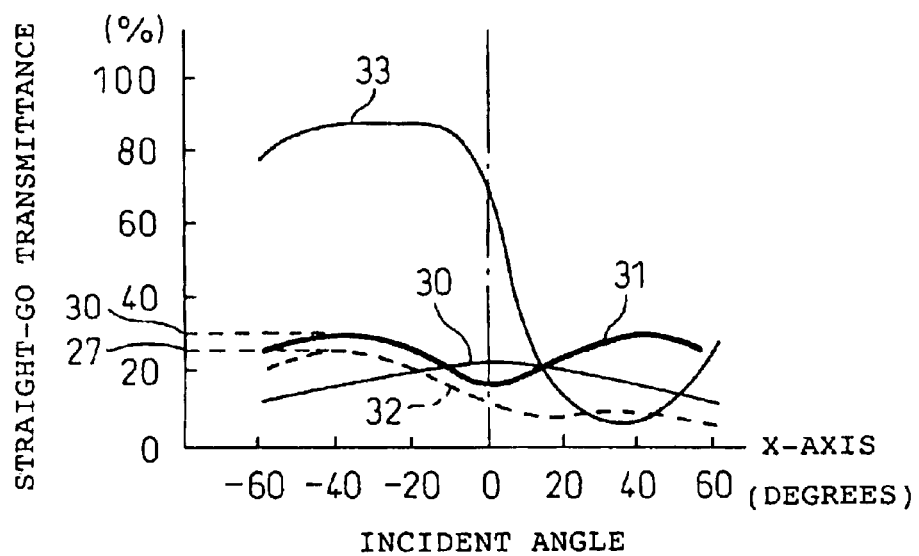
FIG. 2 is a graph showing the incidence angle dependencies of anisotropic scattering layers.

FIGS. 2 and 3 are graphs showing the incidence angle dependencies of the anisotropic scattering layers used in the present invention. FIG. 2 is a graph showing the incident angle dependence of the straight-go transmittance along the X-axis direction oriented at right angles to the Y-axis direction, where the Y-axis direction is the direction of the preferential viewing angle of the anisotropic scattering layer, and FIG. 3 is a graph showing the incidence angle dependence of the straight-go transmittance along the Y-axis direction of the anisotropic scattering layer. In FIGS. 2 and 3, the horizontal axis represents the incident angle relative to the layer normal when the layer normal direction is defined as 0°, and the vertical axis represents the straight-go transmittance.

Figure 4B:
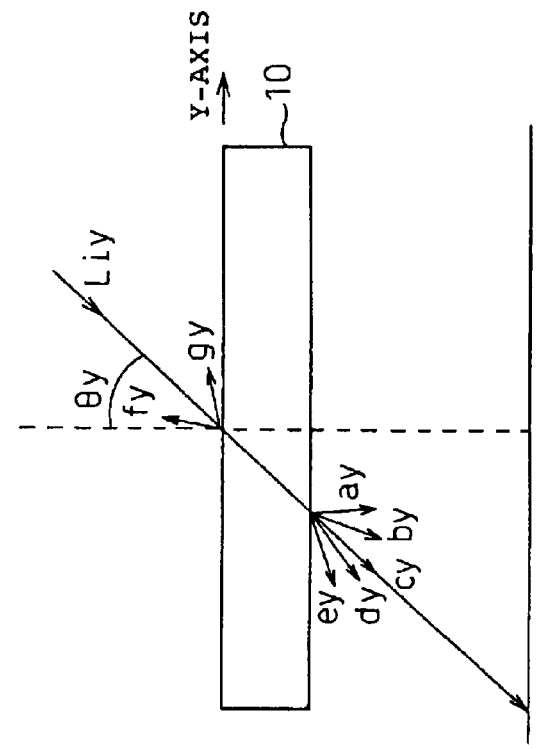
FIGS. 4A and 4B are diagrams for explaining the straight-go transmittance of an anisotropic scattering layer.
Figure 4A:
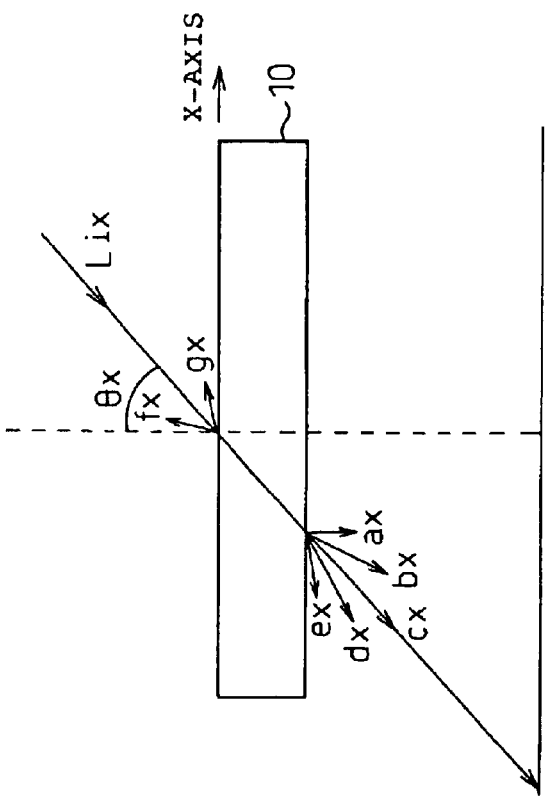

FIGS. 4A and 4B are diagrams for explaining the straight-go transmittance of the anisotropic scattering layer. FIG. 4A shows a cross section of the anisotropic scattering layer taken along the X-axis direction. When a light ray Lix is incident on the anisotropic scattering layer 10 at an incidence angle θx relative to the layer normal indicated by the dashed line, small fractions of the incident light are back scattered as indicated by fx and gx, but most of the light is transmitted specularly through the layer. When it emerges from the anisotropic scattering layer 10, the emerging light is forward-scattered in directions ax, bx, cx, dx, and ex as shown in the diagram. The straight-go transmittance is defined as the ratio of the amount of light transmitted specularly in the direction cx to the amount of the incident light Lix. The straight-go transmittance in the layer normal direction is the ratio of the amount of light cx when the incidence angle θx is 0°, while the straight-go transmittance in an oblique direction is the ratio of the amount of light cx when the incidence angle is not 0°.

FIG. 4B shows a cross section of the anisotropic scattering layer taken along the Y-axis direction. As in the case of the cross section along the X-axis direction, when a light ray Liy is incident on the anisotropic scattering layer 10 at an incidence angle θy relative to the layer normal direction indicated by the dashed line, small fractions of the incident light are back scattered as indicated by fy and gy, but most of the light is transmitted specularly through the layer. When it emerges from the anisotropic scattering layer 10, the emerging light is forward-scattered in directions ay, by, cy, dy, and ey as shown in the diagram. In the Y-axis direction, as in the X-axis direction, the straight-go transmittance is defined as the ratio of the amount of light transmitted specularly in the direction cy to the amount of the incident light Liy. Likewise, the straight-go transmittance in the layer normal direction is the ratio of the amount of light cy when the incident angle θy is 0°, while the straight-go transmittance in an oblique direction is the ratio of the amount of light cy when the incident angle is not 0°.

In FIGS. 2 and 3, the curve 30 shows the characteristic of a conventional scattering layer, and the curve 31 the characteristic of the anisotropic scattering layer used in the present invention, while the dashed curve 32 represents the characteristic of the anisotropic scattering layer used in another embodiment of the present invention. The curve 33 shows the characteristic of the anisotropic scattering layer described in Japanese Unexamined Patent Publication No. 11-119215; as shown, the incidence angle dependence of the straight-go transmittance along the X-axis direction is asymmetrical about the layer normal. The incident angle dependence of the straight-go transmittance along the Y-axis direction is symmetrical about the layer normal direction, but the difference from the anisotropic scattering layer used in the present invention is that the transmittance in the layer normal direction is higher than the transmittance in any oblique direction.

In the case of the conventional scattering layer with the characteristic shown by the curve 30, the incidence angle dependence of the straight-go transmittance along the X-axis direction is substantially the same as that along the Y-axis direction, as shown in FIGS. 2 and 3. The characteristic is symmetrical about the layer normal of the scattering layer, and the straight-go transmittance in the layer normal direction of the scattering layer is higher than the straight-go transmittance in any oblique direction. Further, the straight-go transmittance along the X-axis direction is substantially the same as that along the Y-axis direction for the entire range of the incidence angle, and the scattering performance is therefore substantially constant.

In the case of the anisotropic scattering layer of the present invention with the characteristic shown by the curve 31, the incidence angle dependence of the straight-go transmittance along the X-axis direction and that along the Y-axis direction are both symmetrical about the layer normal of the anisotropic scattering layer, and the straight-go transmittance in the layer normal direction of the scattering layer is lower than the straight-go transmittance in any oblique direction. The straight-go transmittance in the oblique angle range differs between the X-axis direction and the Y-axis direction. As shown in FIGS. 2 and 3, in the illustrated example, the maximum straight-go transmittance in the oblique angle range is 30% for the X-axis direction, which is larger than the maximum straight-go transmittance of 24% for the Y-axis direction.

In the case of the anisotropic scattering layer used in another embodiment of the invention and having the characteristic shown by the curve 32, the incident angle dependence of the straight-go transmittance along the Y-axis direction is symmetrical about the layer normal direction of the anisotropic scattering layer. However, the incident angle dependence of the straight-go transmittance along the X-axis direction is asymmetrical about the layer normal direction of the anisotropic scattering layer. For the Y-axis direction, the straight-go transmittance in the layer normal direction is lower than that in any oblique direction. Further, as shown in FIGS. 2 and 3, the maximum straight-go transmittance in the oblique angle range is 27% for the X-axis direction, which is larger than the maximum straight-go transmittance of 20% for the Y-axis direction.

Of the total light quantities measured as total transmittance using an integrating sphere, 10 to 20% passes through the scattering layer in a direction parallel to the direction of incidence, and the remaining percentage emerges as scattered light. As earlier described, the proportion of the amount of light transmitted parallel to the incidence direction is defined as the straight-go transmittance. Scattering performance is measured in terms of haze value which is defined as Haze value=100×(Diffuse transmittance)/(Total transmittance)

(Diffuse transmittance)=(Total transmittance)−(Straight-go transmittance)

The total transmittance of the conventional scattering layer with the characteristic shown by the curve 30 is as high as about 90%, and its diffuse transmittance is about 70%, which means that the haze value is about 80%. on the other hand, in the case of the anisotropic scattering layers with the characteristics shown by the curves 31 and 32, the total transmittance is about 90%, and the straight-go transmittance in the layer normal direction is as low as about 12%, achieving a haze value of about 87 and hence high scattering performance. However, the straight-go transmittance for the light incident at an incidence angle of 50° relative to the layer normal increases to about 20%, that is, the haze value is about 78 and the scattering performance thus decreases.

Figure 5:
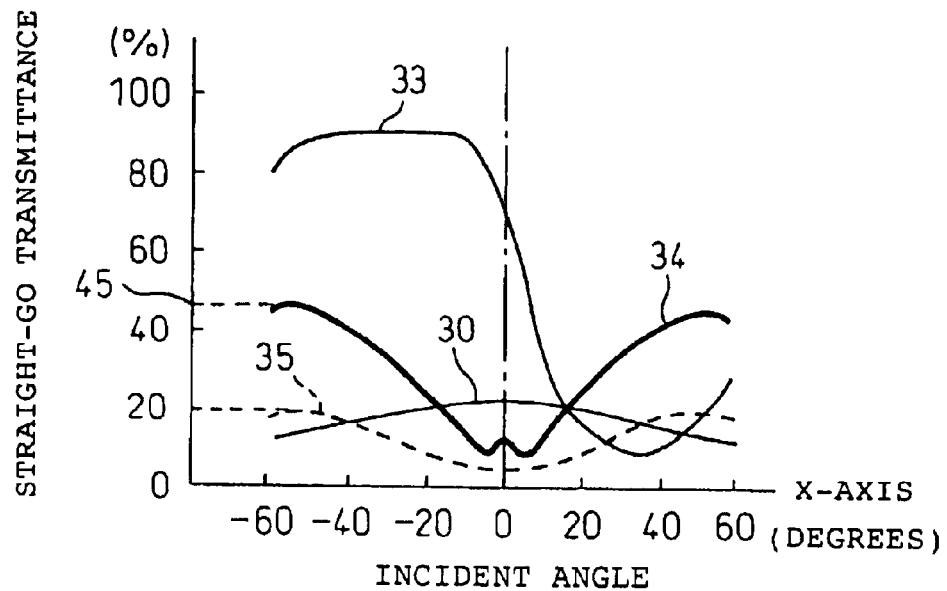
FIG. 5 is a graph showing the incidence angle dependencies of anisotropic scattering layers.
Figure 6:
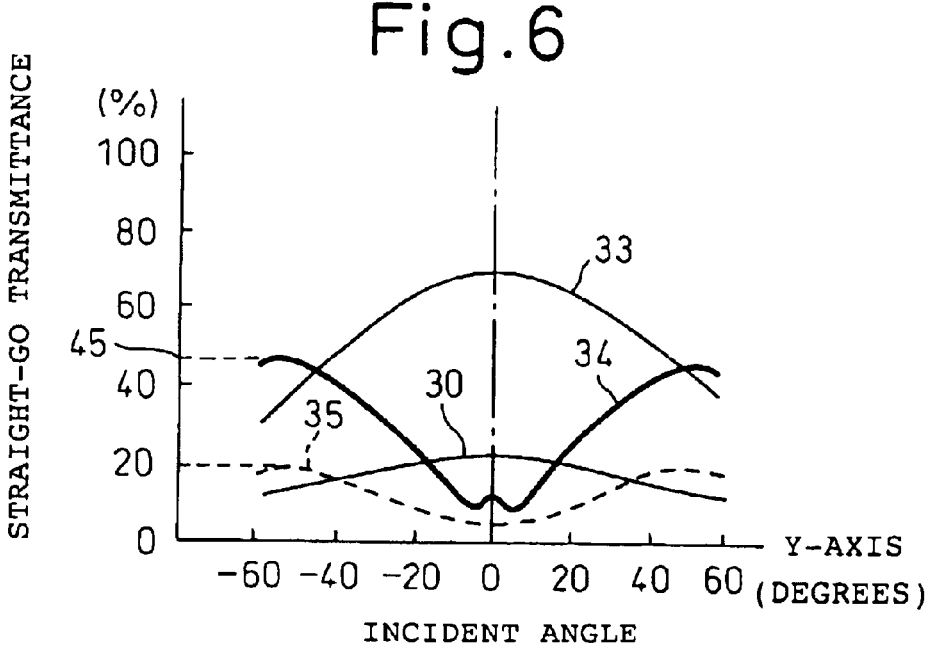
FIG. 6 is a graph showing the incidence angle dependencies of anisotropic scattering layers.

FIGS. 5 and 6 are graphs showing the incidence angle dependencies of the anisotropic scattering layers used in other embodiments of the present invention. FIG. 5 is a graph showing the incidence angle dependence of the straight-go transmittance along the X-axis direction of each anisotropic scattering layer, and FIG. 6 is a graph showing the incidence angle dependence of the straight-go transmittance along the Y-axis direction of each anisotropic scattering layer. In FIGS. 5 and 6, the curve 30 shows the incidence angle dependence of the conventional scattering layer explained with reference to FIGS. 2 and 3, while the curve 33 shows the incidence angle dependence of the scattering layer described in Japanese Unexamined Patent Publication No. 11-119215 and exhibiting a characteristic asymmetric about the layer normal as previously explained with reference to FIGS. 2 and 3.

Curves 34 and 35 will be explained. In the case of the anisotropic scattering layers used in the present invention and having the characteristics shown by the curves 34 and 35, respectively, the incidence angle dependence of the straight-go transmittance is symmetrical about the layer normal of the anisotropic scattering layer for both the X-axis and Y-axis directions, and the straight-go transmittance in the layer normal direction is lower than that in any oblique direction. Further, as can be seen from the diagrams, the incidence angle dependence of the straight-go transmittance is the same in value for both the X-axis and Y-axis directions.

The anisotropic scattering layer with the characteristic shown by the dashed curve 35 has lower straight-go transmittance and hence higher scattering performance than the anisotropic scattering layer represented by the curve 34.

Next, embodiments of the liquid crystal display of the present invention will be described below.

EMBODIMENT 1

Figure 7:
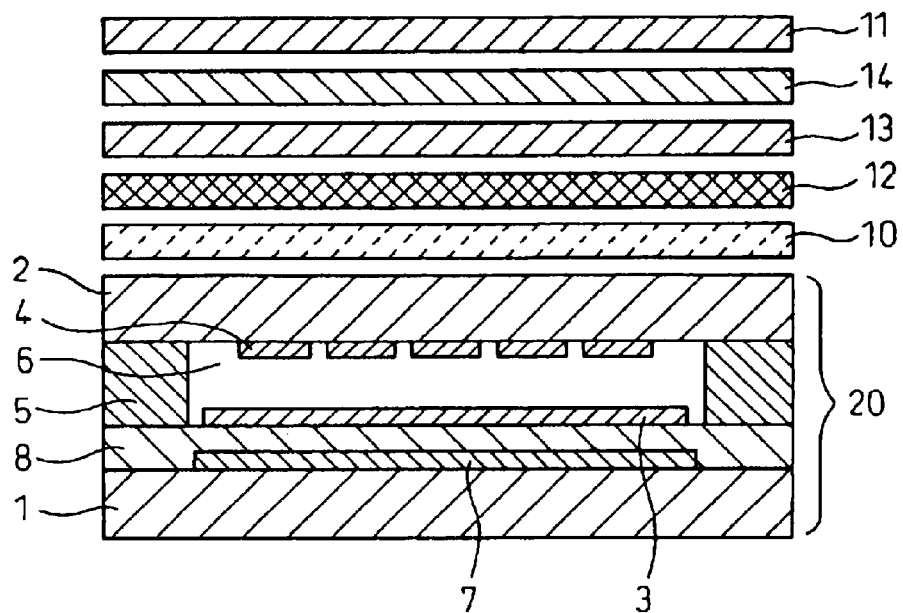
FIG. 7 is a cross-sectional view showing the configuration of a liquid crystal display according to the present invention.

FIG. 7 shows the configuration of a liquid crystal display according to a first embodiment. As shown in FIG. 7, the liquid crystal display comprises a liquid crystal device 20, an anisotropic scattering layer 10 formed on the upper side of the liquid crystal device 20, that is, the side nearer to the viewer and opposite from the side where a reflector is provided, a twisted phase film 12, a first retardation film 13, a second retardation film 14, and a top polarizer 11. In the present embodiment, three retardation films, that is, the twisted retardation film 12, the first retardation film 13, and the second retardation film 14, together constitute the optical compensating element.

The top polarizer 11, the second retardation film 14, the first retardation film 13, the twisted retardation film 12, and the anisotropic scattering layer 10 are laminated together using an acrylic adhesive, and the anisotropic scattering layer 10 is bonded to the liquid crystal device 20 by using an acrylic resin.

The liquid crystal device 20 comprises; a first substrate 1 formed from a 0.5-mm thick glass plate on which are formed a 0.1-μm thick reflective layer 7 made of aluminum, a 2-μm thick protective film 8 made of an acrylic resin, and a first electrode array 3 made of ITO which is a transparent electrode material; a second substrate 2 formed from a 0.5-mm thick glass plate on which is formed a second electrode array 4 made of ITO; a seal member 5 for bonding the first and second substrates 1 and 2 together; and a nematic liquid crystal 6 with left-handed 240° twisted orientation sandwiched between the first and second substrates 1 and 2.

The transmittance of the first and second electrodes 3 and 4 made of ITO has a significant effect on brightness. The lower the sheet resistance of ITO, the larger the ITO thickness, and the lower the transmittance. In the present embodiment, since data signals are applied to the second electrodes 4, ITO with a sheet resistance of 100 ohms and a thickness of 0.05 μm is used. Average transmittance is about 92%.

Since scanning signals are applied to the first electrodes 3, ITO with a sheet resistance of 10 ohms and a thickness of 0.3 μm is used in order to reduce cross talk. Though the average transmittance decreases to about 89%, brightness is improved in the present embodiment by using transparent electrodes with a transmittance of 90% or higher at least on one of the substrates.

Figure 8:
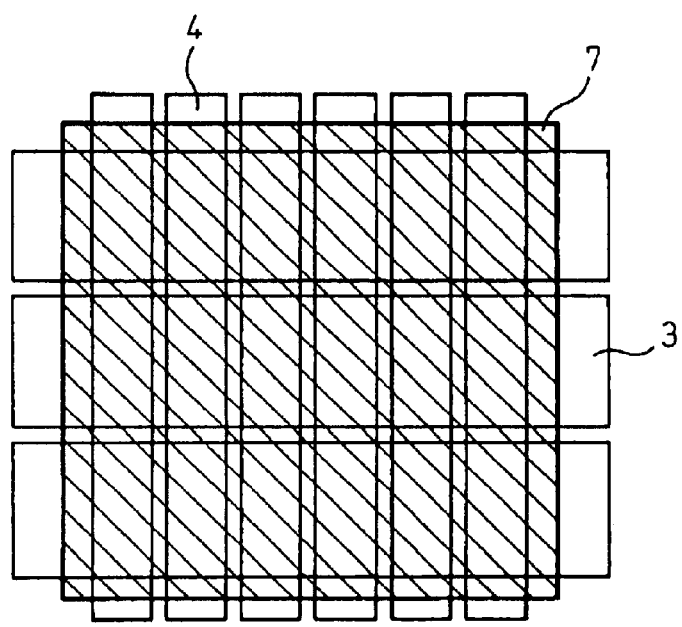
FIG. 8 is an enlarged plan view showing a pixel section of the liquid crystal display according to the present invention.

FIG. 8 is an enlarged plan view showing a pixel section of the liquid crystal display. Pixels are formed at the intersections of the first electrodes 3 and second electrodes 4. Indicated at 7 is the reflective layer.

The reflective layer 7 is formed by sputtering an aluminum thin film and then sputtering SiO2 to a thickness of 0.03 μm to protect the surface. As shown in FIG. 8, the reflective layer 7 is formed in a rectangular shape over the pixel section. Since no particular surface treatment is applied, the reflective layer 7 thus formed has a specular surface.

It is desirable that the top polarizer 11 be formed from a material that is as bright as possible and that provides as high a degree of polarization as possible. In the present embodiment, a material having a transmittance of 45% and a degree of polarization of 99.9% is used for the polarizer. A non-reflective layer with a reflectance of about 0.5% is formed on the surface of the top polarizer 11. The non-reflective layer is formed by depositing several inorganic films of different refractive indices by vacuum evaporation or sputtering. The provision of this layer serves to reduce the surface reflection of the top polarizer 11 and improve the transmittance for enhanced brightness. Contrast also improves because of the reduced black level.

The twisted retardation film 12 is formed in the following manner. A liquid crystalline polymer having a twisted structure is applied onto a triacetylcellulose (TAC) film or a polyethylene terephthalate (PET) film treated for alignment, is changed into a liquid crystal state by heating to a temperature of about 150° C. and, after adjusting the twist angle, is rapidly cooled to room temperature thereby fixing the twisted state. Alternatively, an alignment film is treated for alignment, a liquid crystalline polymer is applied, and after fixing the twisted state, the liquid crystalline polymer is transferred from the alignment film to a separately prepared TAC film. In the present embodiment, a right-handed twisted retardation film having a twist angle Tc=−240° and exhibiting birefringence of Δnd value Rc=0.80 $\mu$m is used as the twisted retardation film 12.

The first retardation film 13 is a transparent film about 70 $\mu$m in thickness formed by stretching polycarbonate (PC), and its phase difference value F1 is 0.14 $\mu$m, i.e., one quarter wavelength, when the wavelength is 0.55 $\mu$m. The second retardation film 14 is also a transparent film about 70 $\mu$m in thickness formed by stretching PC, and its phase difference value F2 is 0.28 $\mu$m, i.e., one half wavelength, when the wavelength is 0.55 $\mu$m.

The anisotropic scattering layer 10 used in the present embodiment has the characteristic shown by the curve 31 in FIGS. 2 and 3.

As shown by the curve 31 in FIG. 2, the incident angle dependence of the straight-go transmittance along the X-axis direction is symmetrical about the layer normal. In the layer normal direction, the straight-go transmittance is as low as 16%, and the haze value is about 82, that is, the degree of scattering is high. However, in the X-axis direction, as the incident angle relative to the layer normal increases, meaning that the light is incident at an oblique angle, the straight-go transmittance increases symmetrically up to the maximum value of about 30%, and the haze value decreases to about 67.

As shown by the curve 31 in FIG. 3, the incident angle dependence of the straight-go transmittance along the Y-axis direction is symmetrical about the layer normal direction. In the layer normal direction, the straight-go transmittance is as low as 16%, and the haze value is about 82, that is, the degree of scattering is high. However, in the Y-axis direction, as the incidence angle relative to the layer normal increases, the straight-go transmittance increases symmetrically up to the maximum value of about 24%, and the haze value decreases to about 73.

As can be seen from FIGS. 2 and 3, according to the characteristic shown by the curve 31, the incidence angle dependence is symmetrical about the layer normal for both the X-axis and Y-axis directions, and the straight-go transmittance in the layer normal direction is lower than the straight-go transmittance in any oblique direction. On the other hand, the straight-go transmittance is higher for light rays obliquely incident along the X-axis direction than for light rays obliquely incident along the Y-axis direction. That is, the maximum value of the straight-go transmittance differs between the X-axis direction and the Y-axis direction.

Figure 9:
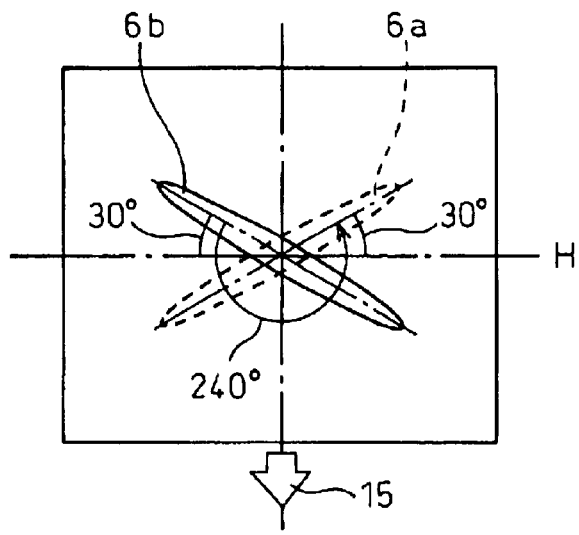
FIG. 9 is a plan view showing the relative orientations of the component elements of the liquid crystal display according to the present invention.
Figure 10:
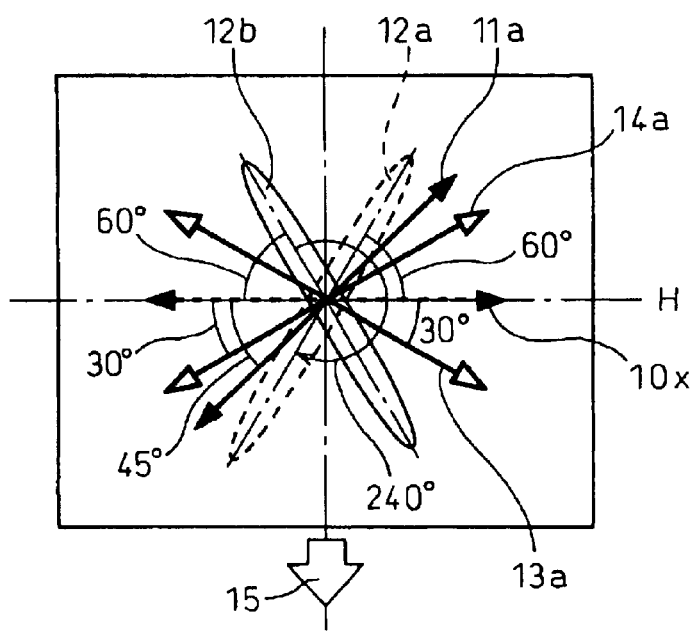
FIG. 10 is a plan view showing the relative orientations of the component elements of the liquid crystal display according to the present invention.

Next, the relative orientations of the various component elements of the liquid crystal display will be explained with reference to FIGS. 9 and 10. In FIGS. 9 and 10, the liquid crystal display is shown as viewed from the top, that is, from the viewer side. The counterclockwise direction, viewed relative to the horizontal axis H, is defined as the positive rotational direction. In FIG. 7, an alignment film (not shown) is formed on the surface of each of the first electrodes 3 and second electrodes 4. As shown in FIG. 9, the first substrate 1 is rubbed in a direction 30° upward to the right relative to the horizontal axis H, so that the molecular alignment direction of the bottom liquid crystal, 6a, is +30°. On the other hand, the second substrate 2 is rubbed in a direction 30° downward to the right relative to the horizontal axis H, so that the molecular alignment direction of the top liquid crystal, 6b, is −30°. The STN mode liquid crystal device 20 having a left-handed 240° twisted structure is formed by adding a chiral material, a material having a helical structure, to a nematic liquid crystal with viscosity of 20 cp, and by adjusting the helical pitch P to 11 $\mu$m.

The reflective index difference Δn of the nematic liquid crystal material 6 used is 0.15, and the cell gap, d, between the first substrate 1 and the second substrate 2 is set to 5.6 $\mu$m. Accordingly, the amount of birefringence, Δnd, of the liquid crystal device 20, given by the product of the reflective index difference Δn of the nematic liquid crystal material 6 and the cell gap d, is 0.84 $\mu$m.

As shown in FIG. 10, the transmission axis 11a of the top polarizer 11 is oriented +45° relative to the horizontal axis H. The bottom molecular alignment 12a of the twisted phase film 12 is oriented +60° relative to the horizontal axis H, the top molecular alignment 12b is oriented −60° relative to the horizontal axis H, and the right-handed rotational twist angle Tc is 240°. Further, birefringence difference ΔR=Rs−Rc= 0.04 $\mu$m, that is, the birefringence value of the twisted retardation film 12 is set equal to that of the liquid crystal device 20.

The delay axis 13a of the first retardation film is oriented −30° relative to the horizontal axis H, while the delay axis 14a of the second retardation film is oriented +30° relative to the horizontal axis H. The X axis 10x of the anisotropic scattering layer 10 is oriented parallel to the horizontal axis H, that is, at right angles to the preferential viewing angle direction 15.

Next, the operation of the liquid crystal display of the present embodiment will be described. The twist angle Tc and Δnd value Rc of the twisted retardation film 12 are chosen to be approximately equal to the twist angle Ts and Δnd value Rs of the liquid crystal device 20. Further, since the twisted retardation film 12 is oriented at right angles to the liquid crystal molecules, as shown in FIG. 10, the birefringence occurring in the liquid crystal device 20 is completely compensated for, and the birefringence is thus eliminated.

The first retardation film 13, whose phase difference value F1 is 0.14 $\mu$m which is approximately equal to one quarter wavelength, and the second retardation film 14, whose phase difference value F2 is 0.28 $\mu$m which is approximately equal to one half wavelength, are placed one on top of the other with their axes oriented at 60°. The combined phase difference value of the two films for wavelength 0.55 $\mu$m is 0.14 $\mu$m, but the phase difference value becomes smaller than 0.14 $\mu$m at shorter wavelengths near 0.4 $\mu$m, and larger than 0.14 $\mu$m at longer wavelengths near 0.7 $\mu$m. The effective retardation axis of the two films combined is parallel to the horizontal axis.

That is, using the two retardation films, it becomes possible to construct a so-called wideband quarter wave plate whose phase difference value is smaller at shorter wavelengths than at longer wavelengths. In other words, the F/λ value, i.e., the phase difference value F divided by the wavelength λ, can be made approximately equal to ¼ over the entire visible light wave length. Accordingly, with the structure comprising the polarizer, the wideband quarter wave plate, and the reflector arranged in this order from the top, the linearly polarized light passed through the polarizer is converted into circularly polarized light by passing through the quarter wave plate, reflected by the reflector, and passed again through the quarter wave plate where the light is converted back to linearly polarized light with its polarization direction rotated 90°; the linearly polarized light is then absorbed by the polarizer, thus creating a completely dark display.

In FIG. 7, the linearly polarized light passed through the top polarizer 11 is converted into circularly polarized light for all wavelengths in the visible region by passing through the second retardation film 14 and the first retardation film 13. Since the twisted retardation film 12 and the liquid crystal device 20 are completely compensated relative to each other, the polarization state does not change. Since the anisotropic scattering layer 10 is formed from a material that has nearly zero phase difference value and does not cause a change in the polarization state, the circularly polarized light reaches the reflective layer 7 without changing its polarization state.

The circularly polarized light incident on the reflective layer 7 is reflected as circularly polarized light with its direction of rotation reversed, and the reflected light is passed through the liquid crystal device 20 and twisted retardation film 12 with its direction of rotation remaining unchanged. However, by passing through the first retardation film 13 and second retardation film 14, the circularly polarized light is converted back to linearly polarized light with its polarization direction rotated 90°, and the linearly polarized light is absorbed by the top polarizer 11, thus creating a completely dark display.

Since the anisotropic scattering layer 10 is formed from a material that has nearly zero phase difference value and does not easily cause a change in the polarization state, the anisotropic scattering layer 10 may be placed anywhere between the second substrate 2 and the first substrate 1 or on the surface of the top polarizer 11. However, it is preferable to place it as close as possible to the second substrate 2 in order to reduce image blurring. It is also preferable to make the second substrate 2 as thin as possible since it can then reduce image blurring. For this reason, a substrate thickness of 0.5 mm is chosen in the present embodiment. It is also possible to reduce the thickness of the second substrate to 0.4 mm, thus making it thinner than the first substrate whose thickness is 0.5 mm.

Next, when a voltage is applied between a pair of first and second electrode 3 and 4, the molecules in the liquid crystal 6 stand up, and the effective Δnd value of the liquid crystal device 20 decreases. As a result, though the linearly polarized light passed through the top polarizer 11 is converted into circularly polarized light by passing through the second retardation film 14 and first retardation film 13, the light is converted back to elliptically polarized light or linearly polarized light by passing through the twisted retardation film 12 and liquid crystal device 20.

If the birefringence occurring in the liquid crystal device 20 due to the voltage application is set approximately equal to one quarter wavelength, the linearly polarized light allowed to pass through the top polarizer 11 is returned unchanged to it without undergoing rotation, and a bright white display can thus be obtained. In this way, by using the twisted retardation film 12, first retardation film 13, and second retardation film 14, good contrast ratio can be obtained.

Figure 11:
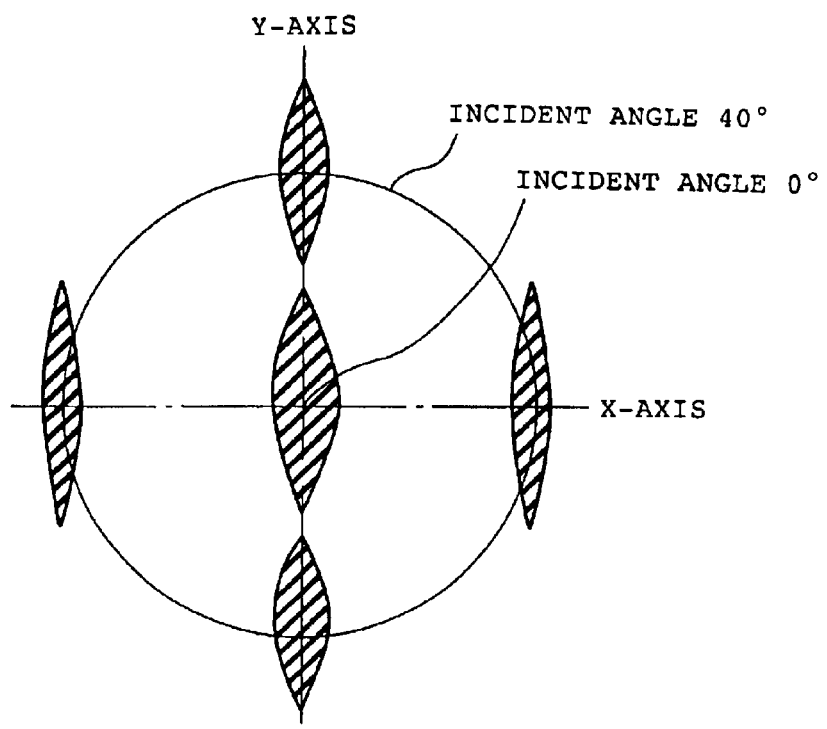
FIG. 11 is a diagram showing the light scattering characteristic of an anisotropic scattering layer used in the liquid crystal display according to the present invention.

FIG. 11 shows the light scattering characteristic of the anisotropic scattering layer 10 used in the first embodiment of the invention. The shaded region with the incidence angle 0° indicates the transmission state of light incident on the anisotropic scattering layer 10 in the layer normal direction thereof, and the top, bottom, right, and left shaded regions show the light transmission states when light is incident from the respective directions at an angle of 40° relative to the layer normal. The region size shows the scattering area, and the thickness of the oblique lines represents the intensity of light. That is, FIG. 11 shows the distribution of the forward-scattered light rays ax, bx, cx, dx, and ex shown in FIG. 4A and the forward-scattered light rays ay, by, cy, dy, and ey shown in FIG. 4B. For example, the shaded region at the 12 o'clock position shows the distribution of the amount of light scattered in the directions ax to ex and ay to ey when θx in FIG. 4A is 0° and θy in FIG. 4B is 40°.

The anisotropic scattering layer 10 of the present embodiment has the characteristic that incident light in the layer normal direction is scattered in the shape of a rugby ball, as shown by the shaded region in the center of FIG. 11. That is, the characteristicis such that the incident light is scattered along the Y-axis direction coinciding with the preferential viewing angle direction, but much less along the X-axis direction. Thus, the scattering angle along the Y-axis direction is greater than that along the X-axis direction. The same is true of obliquely incident light in the top, bottom, left, and right regions in FIG. 11; that is, the incident light is scattered more along the Y-axis direction, but less along the X-axis direction. This is because the anisotropic scattering layer used in the present embodiment has the characteristic (shown by the curve 31) that the straight-go transmittance is higher for light rays obliquely incident along the X-axis direction than for light rays obliquely incident along the Y-axis direction, as shown in FIGS. 2 and 3. As a result, the reflectance in the layer normal direction is doubled compared with the conventional scattering layer, and thus a correspondingly brighter display can be obtained.

In this way, with the provision of the anisotropic scattering layer 10 containing regions where the light entering the anisotropic scattering layer is scattered over a wider angle along the Y-axis direction than along the X-axis direction, it becomes possible to collect and reflect ambient light for scattering in the 6 o'clock direction and the layer normal direction coinciding with the viewing direction, and a bright and high-contrast display can thus be achieved.

Figure 12:
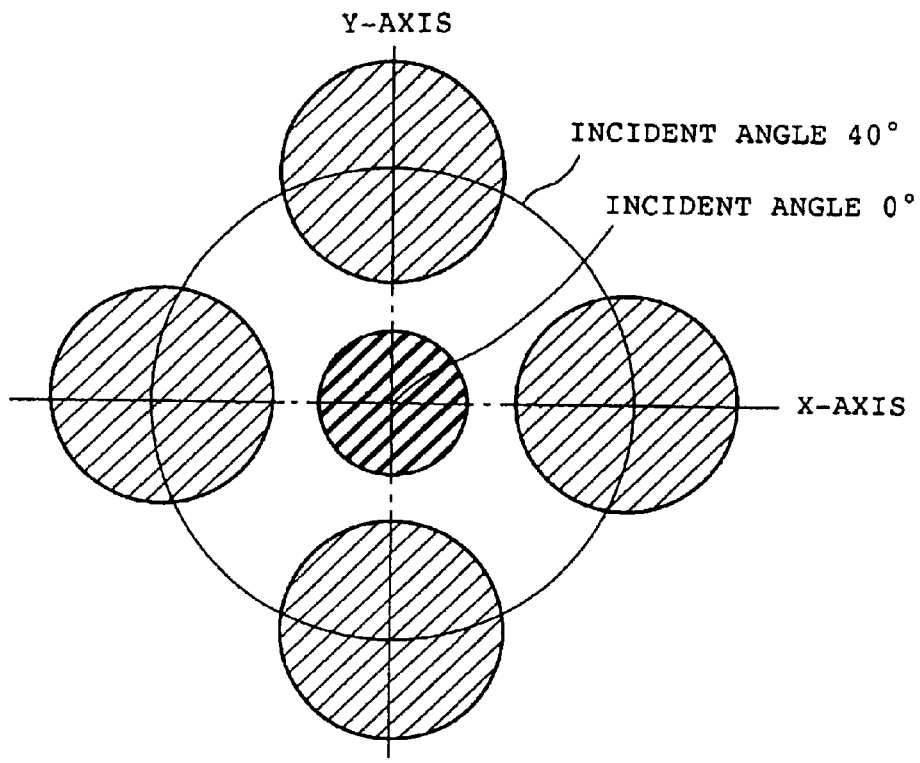
FIG. 12 is a diagram showing the light scattering characteristic of a conventional scattering layer.

For comparison purposes, the light scattering characteristic of the commonly used conventional scattering layer will be described below. FIG. 12 is a diagram showing the light scattering characteristic of the commonly used conventional scattering layer. The straight-go transmittance of the conventional scattering layer is shown by the curve 30 in FIGS. 2 and 3. As shown by the shaded regions in FIG. 12, the conventional scattering layer has the characteristic that the incident light is scattered in a substantially circular shape, regardless of whether the light is incident in the layer normal direction, that is, the incident angles θx and θy are both 0°, or is incident in an oblique angle, that is, either one of the incident angles θx and θy is, for example, 40°. This means that, at any incident angle, the scattering angle along the X-axis direction is substantially equal to that along the Y-axis direction. Furthermore, since the scattering angle increases with increasing incident angle, the shaded region area is larger when the incident angle is 40° than when it is 0°. This shows that the degree of scattering of the conventional scattering layer increases and straight-go transmittance decreases with increasing incident angle, as can be seen from the curve 30 in FIGS. 2 and 3.

In the present embodiment, a 240° twisted STN mode liquid crystal device is used as the liquid crystal device 20.

However, a similar reflective liquid crystal display can be constructed using a TN liquid crystal device having a twist angle of about 90°. When producing a large-screen display using a TN liquid crystal device, it is preferable to construct it as an active-matrix reflective liquid crystal display using active devices such as TFTs or MIMs.

In the present embodiment, a retardation film produced by monoaxially stretching PC, and having the characteristic that the refractive index nz in the Z-axis direction is related to the refractive index nx in the stretching direction and the refractive index ny in the perpendicular direction such that nx>ny=nz, has been used for each of the first and second retardation films 13 and 14. However, a similar effect can also be obtained if each retardation film is formed from a so-called Z-type retardation film produced by multi-axial stretching and having the relation nx>nz>ny, or from a retardation film produced by stretching polyvinyl alcohol (PVA), polypropylene (PP), or like material.

In the present embodiment, the delay axis 13a of the first retardation film has been oriented at −30°, and the delay axis 14a of the second retardation film at +30°. However, if the delay axis 13a of the first retardation film is oriented at +30°, and the delay axis 14a of the second retardation film at −30°, the same effect can be obtained as long as they are oriented at 60° relative to each other.

In the present embodiment, the optical compensating element has been described as being constructed using three retardation films, that is, the twisted retardation film 12, the first retardation film 13, and the second retardation film 14. However, more than three retardation films may be used. Furthermore, the optical compensating element may be constructing using only one twisted retardation film or only one retardation film. Alternatively, it may be constructed using both the twisted retardation film and the retardation film.

When a liquid crystal display was constructed by using the same liquid crystal device 20 as used in the present embodiment and by arranging, outside the liquid crystal device 20, the anisotropic scattering layer 10, the twisted retardation film 12 with a twist angle of 180° and a Δnd value Rc=0.68 μm, and the top polarizer 11 with its transmission axis 11a oriented at −55° relative to the horizontal axis H, a bright and high-contrast ratio display was obtained.

Further, when a liquid crystal display was constructed by using the same liquid crystal device 20 as used in the present embodiment and by arranging outside the liquid crystal device 20 the anisotropic scattering layer 10, the twisted retardation film 12 with a twist angle of 220° and Δnd value Rc=0.60 μm, the first retardation film 13 with the phase difference value F1=0.63 μm, and the top polarizer 11 with its transmission axis 11a oriented at 70° relative to the horizontal axis H, a bright and high-contrast display could again be achieved.

EMBODIMENT 2

Next, a liquid crystal display according to a second embodiment of the present invention will be described below. The configuration of the liquid crystal display of the second embodiment is the same as that shown in FIG. 1. As shown in FIG. 1, the liquid crystal display includes the liquid crystal device 20, the anisotropic scattering layer 10 formed on the side nearer to the viewer than to the reflector, the retardation film 13 as the optical compensating element, and the top polarizer 11. The top polarizer 11, the retardation film 13, and the anisotropic scattering layer 10 are laminated together using an acrylic adhesive, and the anisotropic scattering layer 10 is bonded to the liquid crystal device 20 by using an acrylic resin.

The configuration of the liquid crystal device 20 is the same as that used in the first embodiment, and therefore, the description of it will not be repeated here.

The retardation film 13 is a transparent film about 70 μm in thickness formed by stretching polycarbonate (PC), and its phase difference value F1 is 0.39 μm when the wavelength is 0.55 μm. The so-called Z-type retardation film whose refractive indices are defined by the relation nx>nz>ny, where nx is the refractive index in the delay axis direction, ny is the refractive index in the perpendicular direction, and nz is the refractive index in the thickness direction, is used for the retardation film 13. By using the Z-type retardation film for the retardation film 13, the viewing angle characteristic can be improved. It is of course possible to use a conventional retardation film having the relation nx>ny=nz.

In the present embodiment, the anisotropic scattering layer 10 has the characteristic shown by the curve 32 in FIGS. 2 and 3.

As shown by the curve 32 in FIG. 2, the anisotropic scattering layer used in the second embodiment has the characteristic that the incident angle dependence along the X-axis direction is asymmetrical about the layer normal. In the positive angle region, the straight-go transmittance decreases and the scattering ratio increases, while in the negative angle region, the straight-go transmittance increases up to 27% and the haze value, which represents the degree of scattering, decreases to 70. On the other hand, the incident angle dependence along the Y-axis direction is symmetrical about the layer normal, as shown by the curve 32 in FIG. 3. In the layer normal direction, the straight-go transmittance is as low as 12%, and the haze value, which represents the degree of scattering, is as high as about 87. However, in both the positive and negative angle regions, as the incident angle increases, the straight-go transmittance increases up to about 20%, and the haze value decreases to about 78.

In the present embodiment, a special photopolymer, known by the brand name MF-I film and manufactured by Microsharp, was used for the anisotropic scattering layer 10. This anisotropic scattering layer 10 has a thickness of about 50 μm, and exhibits a scattering characteristic that differs between the X-axis direction and the Y-axis direction, that is, the scattering angle along the X-axis direction is 16°, and that along the Y-axis direction is 32°.

Figure 13:
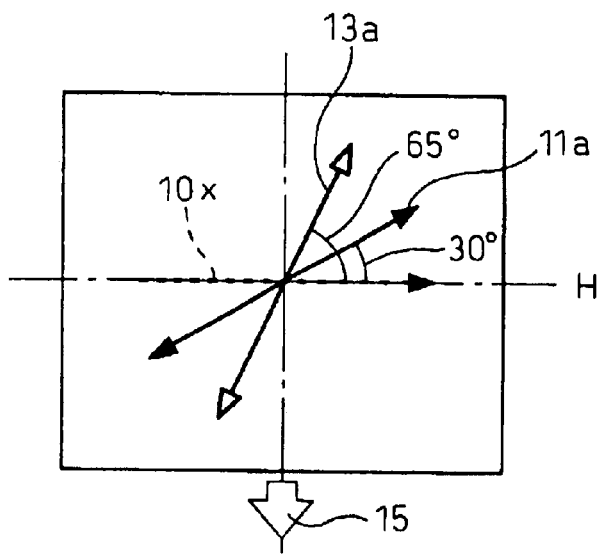
FIG. 13 is a plan view showing the relative orientations of the component elements of the liquid crystal display according to the present invention.

Next, the relative orientations of the various component elements will be described below. The relative orientations of the component elements of the liquid crystal device 20 are the same as those shown in FIG. 9, and will not be described here. FIG. 13 is a diagram showing the relative orientations of the component elements of the liquid crystal display according to the present embodiment.

The reflective index difference Δn of the nematic liquid crystal 6 used is 0.131, and the cell gap, d, between the first substrate 1 and the second substrate 2 is set to 5.8 μm. Accordingly, the amount of birefringence, Δnd, of the liquid crystal device 20, given by the product of the reflective index difference Δn of the nematic liquid crystal material 6 and the cell gap d, is 0.76 μm. With this alignment, the viewing direction 15 coincides with the direction of 6 o'clock.

As shown in FIG. 13, the absorption axis 11a of the top polarizer 11 is oriented +30° relative to the horizontal axis H. The delay axis 13a of the retardation film 13 is oriented +65° relative to the horizontal axis H; therefore, the absorption axis 11a of the top polarizer 11 and the delay axis 13a of the retardation film 13 are oriented at 35° relative to each other. The X axis 10x of the anisotropic scattering layer is oriented parallel to the horizontal axis H, that is, at right angles to the viewing direction 15. The arrow mark on the X axis 10x of the anisotropic scattering layer indicates the positive direction in FIG. 2 in which the straight-go transmittance decreases with increasing incidence angle.

Next, the operation of the liquid crystal display of the present embodiment will be described with reference to the drawing. By carefully optimizing the orientation angle between the retardation film 13 and the top polarizer 11, the phase difference value F1 of the retardation film 13, and the $\Delta nd$ value of the liquid crystal device 20, a nearly perfect black display state can be obtained in the OFF state. In FIG. 1, the linearly polarized light passed through the top polarizer 11 is converted into circularly polarized light for all wavelengths in the visible region by passing through the retardation film 13 and nematic liquid crystal material 6. Since the anisotropic scattering layer 10, the first electrodes 3, and the protective layer 8 exhibit little birefringence, the circularly polarized light reaches the reflective layer 7 without changing its polarization state.

The circularly polarized light reflected by the reflective layer 7 is again passed through the nematic liquid crystal material 6 and retardation film 13, and thereby converted back to linearly polarized light with its polarization direction rotated 90°, and the linearly polarized light is absorbed by the top polarizer 11, thus producing a good black display state.

Next, when a voltage is applied between a pair of first and second electrodes 3 and 4, the molecules in the liquid crystal 6 stand up, and the effective $\Delta nd$ value of the liquid crystal device 20 decreases. As a result, the linearly polarized light passed through the top polarizer 11 is not converted into perfect circularly polarized light when passed through the retardation film 13 and nematic liquid crystal material 6, but is converted into elliptically polarized light or linearly polarized light.

If the amount of birefringence occurring in the nematic liquid crystal material 6 due to the voltage application is set approximately equal to one quarter wavelength, the birefringence is offset by the retardation film 13 and the phase difference value becomes 0; as a result, the linearly polarized light allowed to pass through the top polarizer 11 is returned unchanged to it without undergoing rotation, and a white display state can thus be obtained.

In the present embodiment, since the anisotropic scattering layer 10 is provided between the liquid crystal device 20 and the retardation film 13, the incident light is scattered by the anisotropic scattering layer 10 and emerges in different directions including the viewing angle direction. This serves to enhance the display brightness.

Figure 14:
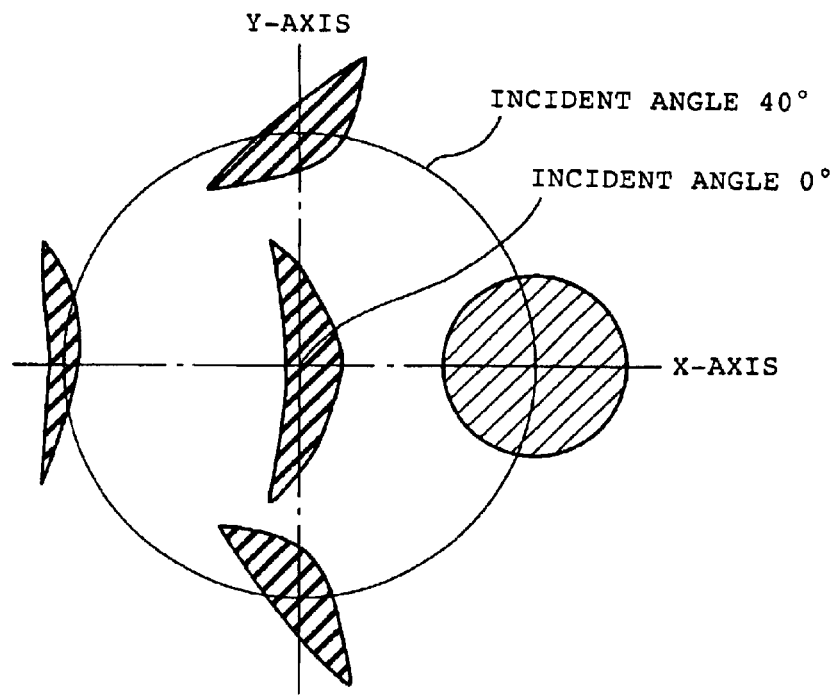
FIG. 14 is a diagram showing the light scattering characteristic of an anisotropic scattering layer used in the liquid crystal display according to the present invention.

FIG. 14 shows the light scattering characteristic of the anisotropic scattering layer 10 used in the present embodiment. The shaded region labeled as incidence angle 0° shows the scattering condition of the light incident on the anisotropic scattering layer 10 in the layer normal direction and transmitted through it. The shaded regions at left and right each show the scattering condition of transmitted light when the incident light is tilted along the X-axis direction relative to the layer normal, that is, with the incident angle $\theta x$ at +40° or −40°, respectively, and the incident angle $\theta y$ at 0°, and the top and bottom shaded regions each show the scattering condition of transmitted light when the incident light is tilted along the Y-axis direction relative to the layer normal, that is, with the incident angle $\theta y$ at +40° or −40°, respectively, and the incident angle $\theta x$ at 0°.

The anisotropic scattering layer 10 used in the present embodiment has the characteristic that the light incident in the layer normal direction is scattered in the shape of a crescent as can be seen from the scattering conditions shown in the center of FIG. 14, at the −40° tilt position on the X axis, and at the +40° and −40° tilt positions on the Y axis. That is, the characteristic is such that the incident light is scattered more along the Y-axis direction, but less along the X-axis direction. The scattering angle along the Y-axis direction is therefore greater than the scattering angle along the X-axis direction. As a result, the reflectance in the layer normal direction is doubled to 30% to 40%, compared with the conventional scattering layer, and thus a correspondingly brighter display can be obtained.

On the other hand, as shown by the shaded region at the 12 o'clock position, when the incident light is tilted by 40° along the Y-axis direction, the scattering region slightly rotates; in this condition, the incident light is scattered primarily in the seven o'clock and one o'clock directions, but also scattered intensely along the Y-axis direction. Likewise, as shown by the bottom shaded region, when the incident light is tilted by −40° along the Y-axis direction, the scattering region slightly rotates, and the light is scattered in the layer normal direction as well as along the Y-axis direction; since the ambient light can be scattered intensely in the viewing angle direction, a bright display can be achieved.

Further, as shown by the curve 32 in FIG. 2, the anisotropic scattering layer 10 used in the second embodiment has the characteristic that the incident angle dependence along the X-axis direction is asymmetrical about the layer normal, and the degree of scattering of the light incident with an incidence angle of 40° along the X-axis direction is high. As a result, the light incident at this angle is scattered in the shape of a circle as shown at the right in figure 14. In this case, since the light is scattered widely in all directions, as shown by the circular scattering condition, brightness is somewhat lost, but the display brightness as a whole improves. The brightness can also be improved if the anisotropic scattering pattern is rotated 180° and the high scattering region is positioned at the opposite side. Further, as shown in FIGS. 2 and 3, the maximum straight-go transmittance for light rays obliquely incident along the X-axis direction is about 27%, while the maximum straight-go transmittance for light rays obliquely incident along the Y-axis direction is about 20%; that is, the maximum value is higher for light rays obliquely incident along the X-axis direction.

In the present embodiment, a 240° twisted STN mode liquid crystal device has been used as the liquid crystal device 20. However, a similar reflective liquid crystal display can be constructed using a TN liquid crystal device having a twist angle of about 90°. When producing a large-screen display using a TN liquid crystal device, it is preferable to construct it as an active-matrix reflective liquid crystal display using active devices such as TFTs or MIMS.

Further, in the present embodiment, the first reflective layer 7 has been formed separately from the first electrode array 3, but the structure can be simplified by forming the first electrode array using a thin film of metal such as aluminum or silver. If the reflective layer 7 is formed on the outside of the first substrate 1, a similar effect can be obtained, though shadows appear on the display.

Also, the reflective layer 7 has been formed by depositing a SiO2 thin film on an aluminum thin film, but if a multilayered film consisting of two to four inorganic films of different refractive indices is formed on the aluminum thin film, the reflectance increases and a further desirable effect can be obtained. A thin film of aluminum alloy or silver alloy may be used instead of aluminum.

Further, the optical compensating element has been constructed using one retardation film, but a similar liquid crystal display can also be achieved if a plurality of retardation films are used. For example, the optical compensating element may be constructed using both a twisted retardation film and a retardation film. When the optical compensating element was constructed using two retardation films, one with a phase difference value of 0.2 $\mu$m and the other with a phase difference value of 0.4 $\mu$m, and the transmission axis 11a of the top polarizer was oriented −50° relative to the horizontal axis H, the configuration otherwise being the same as the configuration of the present embodiment, a bright and high-contrast reflective display was obtained.

EMBODIMENT 3

A third embodiment of the present invention will be described below. The configuration of the liquid crystal display of this embodiment is the same as that shown in FIG. 1, and the configuration of the pixel section is the same as that shown in FIG. 8. Further, the relative orientations of the various component elements are the same as those shown in FIGS. 9 and 13.

The difference of the liquid crystal display of this embodiment is that the anisotropic scattering layer having the incident angle dependence shown by the curve 34 in FIGS. 5 and 6 is used as the anisotropic scattering layer 10 in the configuration shown in FIG. 1.

As shown by the curve 34 in FIGS. 5 and 6, the anisotropic scattering layer used in this embodiment has the characteristic that, for both the X-axis and Y-axis directions, the incident angle dependence is the same and is symmetrical about the layer normal. In the case of the anisotropic scattering layer 10 used in the present embodiment and having the characteristic shown by the curve 34, the total light transmittance is about 90% and, in the layer normal direction, the straight-go transmittance is as low as about 10% and the scattering performance is high with a haze value of about 90. On the other hand, for the light incident at an angle of 50° relative to the layer normal, the maximum value of the straight-go transmittance is as high as 45% for both the X-axis and Y-axis directions, and the haze value is 50, that is, the scattering performance is low. A material, known by the brand name DPI Film and manufactured by Microsharp, was used for the anisotropic scattering layer 10; this material has the characteristic that, in the layer normal direction, the straight-go transmittance is low and the haze value, a measure of the degree of scattering, is high, that is, about 90, but as the incident angle relative to the layer normal increases, the straight-go transmittance increases and the haze value decreases to about 50. This anisotropic scattering layer 10 has a thickness of about 50 $\mu$m, and its orientation is not specified since the scattering characteristic is symmetrical for both the X-axis and Y-axis directions.

As a modified example of the present embodiment, a material having high scattering performance, such as one having the characteristic shown by the dashed curve 35 in FIGS. 5 and 6, can be used for the anisotropic scattering layer 10. In the case of this curve 35, the maximum value of the straight-go transmittance is the same, that is, about 20% for both the X-axis and Y-axis directions, and the characteristic is symmetrical about the layer normal for both the X-axis and Y-axis directions. The total light transmittance is about 85%, and for the layer normal direction, the haze value is about 95, meaning that the scattering performance is high. On the other hand, for the light incident at an angle of 50° relative to the layer normal, the haze value is 75, that is, the scattering performance decreases. This anisotropic scattering layer was formed using a material known by the brand name DPI Film and manufactured by Microsharp. This anisotropic scattering layer has a thickness of about 50 $\mu$m. and its orientation is not specified since the scattering characteristic is symmetrical for both the horizontal and vertical directions.

Figure 15:
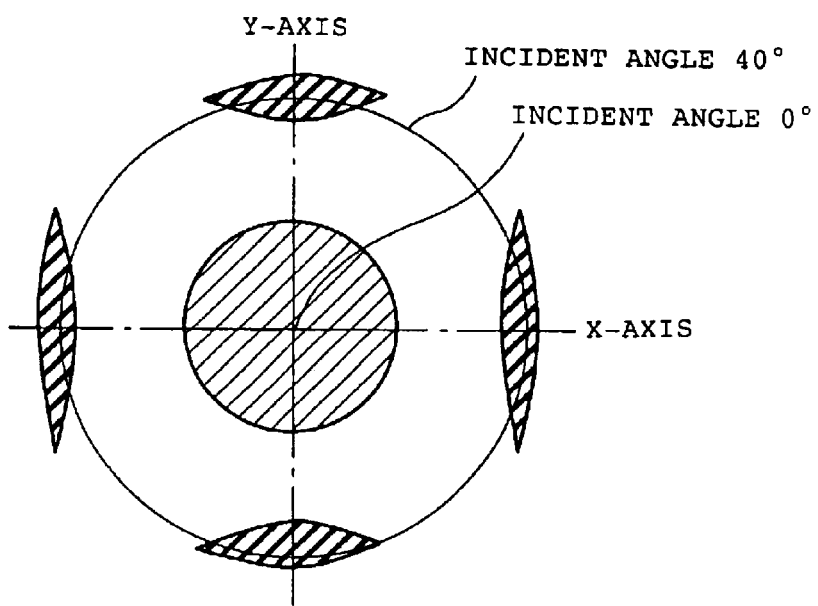
FIG. 15 is a diagram showing the light scattering characteristic of an anisotropic scattering layer used in the liquid crystal display according to the present invention.

Here, an explanation will be given of the scattering characteristics of the anisotropic scattering layers represented by the curves 34 and 35 in FIGS. 5 and 6. FIG. 15 is a diagram showing the scattering characteristic of the anisotropic scattering layer used in the present embodiment and represented by the curves 34 or 35 in FIGS. 5 and 6. As shown by the shaded regions in FIG. 15, the anisotropic scattering layer has the characteristic that when light is incident from the layer normal direction, that is, when the incidence angles θx and θy are both 0°, the incident light is scattered in a circular shape, but when light is incident obliquely, that is, when either one of the incidence angles θx and θy is 40°, the incident light is scattered in the shape of a rugby ball. Notably, at oblique angle positions on the X axis, for example, at the positions where the incidence angle θy is 0° and the incidence angle θx is ±40°, the scattering angle along the Y-axis direction is greater than the scattering angle along the X-axis direction. Since the anisotropic scattering layer with the characteristic of curve 35 provides a higher degree of scattering than the anisotropic scattering layer with the characteristic of curve 34, their actual scattering characteristics differ; that is, though the shaded regions are the same in shape for both, their size is larger for the anisotropic scattering layer with the characteristic of curve 35 than for the anisotropic scattering layer with the characteristic of curve 34.

By using the anisotropic scattering layer containing regions where the scattering angle along the Y-axis direction is greater than the scattering angle along the X-axis direction at certain incident angles as shown in FIG. 15, it becomes possible to collect and reflect ambient light for scattering in the 6 o'clock direction and the layer normal direction coinciding with the viewing direction, and a bright and high-contrast display can thus be achieved.

The configuration of the pixel section is the same as that shown in FIG. 8. The relative orientations of the various component elements are the same as those shown in FIGS. 9 and 13.

As described above, the anisotropic scattering layers used in the present embodiment and its modified example have characteristics such that the incident angle dependence of the straight-go transmittance is symmetrical about the layer normal, and such that the straight-go transmittance in the layer normal direction is lower than the straight-go transmittance in any oblique direction.

It is reported that, in an ordinary use environment, most of the ambient light is incident at angles of 20° to 50° on the liquid crystal display. Therefore, by providing the anisotropic scattering layer having the above-described characteristic, since light rays incident at angles of 20° to 50° can be intensely reflected in the layer normal direction, i.e., the viewing direction, a bright display can be achieved. Furthermore, the contrast improves because back scattering is reduced.

If the anisotropic scattering layer having high scattering performance shown by the curve 35 in FIGS. 5 and 6 is used as the anisotropic scattering layer 10, a more effective result can be obtained. A bright display can also be obtained using a TN mode having a twist angle of about 90°, but when an STN mode having a twist angle of 180° to 260° is used, the viewing angle characteristic improves greatly.

For example, by using the anisotropic scattering layer having high scattering performance described above, in an ordinary use environment the incident light incident at an angle within the incident angle range of 20° to 50° can be intensely reflected in the viewing direction, and thus a high-contrast display with a good viewing angle characteristic can be obtained.

In the liquid crystal display shown in FIG. 1 used in the present embodiment, the optical compensating element has been constructed using one retardation film. In this case, a similar liquid crystal display can also be obtained if a twisted retardation film is used. Further, the optical compensating element may be constructed using a plurality of retardation films, for example, a twisted retardation film and a retardation film.

When the optical compensating element was constructed using two retardation films, one with a phase difference value of 0.2 μm and the other with a phase difference value of 0.4 μm, and the transmission axis 11a of the top polarizer was oriented −50° relative to the horizontal axis H, the configuration otherwise being the same as the configuration of the present embodiment, a bright and high-contrast reflective display was obtained.

EMBODIMENT 4

If the liquid crystal display of the third embodiment is used in a special environment where most of incident rays are incident at angles greater than 50°, most of the light would be specularly reflected with less scattering in the layer normal direction, because the straight-go transmittance is high and the scattering performance low in that angle range, and this would result in reduced display brightness.

Figure 16:
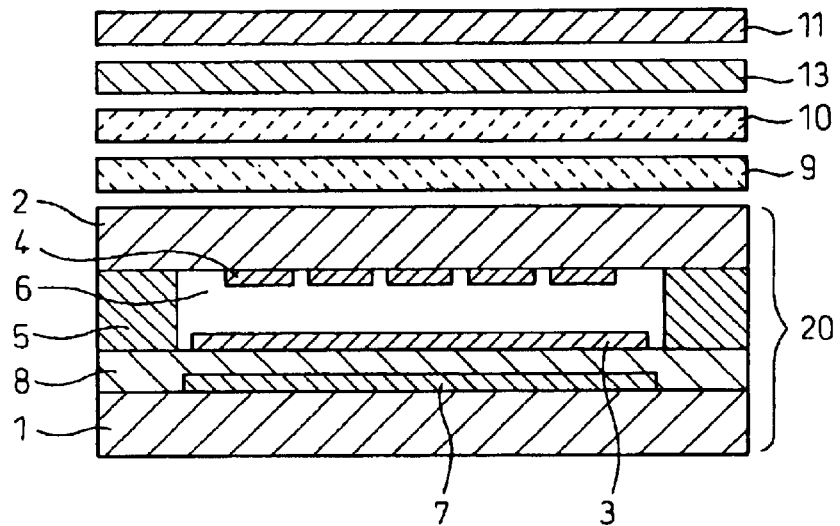
FIG. 16 is a cross-sectional view showing the configuration of a liquid crystal display according to the present invention.

A liquid crystal display that solves this problem is shown in FIG. 16. The configuration of the liquid crystal display shown in FIG. 16 differs from the liquid crystal display shown in FIG. 1 by the inclusion of a conventional scattering layer 9. This scattering layer 9 is formed, for example, by mixing fine particles into a transparent adhesive resin.

In the case of the conventional scattering layer having the characteristic shown by the curve 30 in FIGS. 2 and 3 or 5 and 6, the incident angle dependence of the straight-go transmittance is substantially the same for both the X-axis and Y-axis directions. Further, the characteristic is symmetrical about the layer normal of the scattering layer, and the straight-go transmittance in the layer normal direction is higher than the straight-go transmittance in any oblique direction. The scattering characteristic of this conventional scattering layer has been shown in FIG. 12.

As can be seen, the straight-go transmittance does not change much if the incident angle changes, and the scattering performance is substantially constant. As shown, the transmittance is relatively independent of the incidence angle and, as the incidence angle increases, the transmittance somewhat decreases, increasing the degree of scattering, because the optical pathlength increases. As a result, when this scattering layer is used, it becomes possible to produce a display unaffected by the incidence angle.

In the present embodiment, therefore, the conventional scattering layer is provided in addition to the anisotropic scattering layer as shown in the liquid crystal display of FIG. 16.

With this configuration, incident rays incident at angles smaller than 20° are scattered by the anisotropic scattering layer 10, incident rays incident at angles within a range of 20° to 50° are scattered by both the anisotropic scattering layer 10 and the scattering layer 9, and incident rays incident at angles greater than 50° are scattered by the scattering layer 9. Since incident light incident at any incident angle can be scattered in this way, a high-contrast, single-polarizer liquid crystal display with a good viewing angle characteristic can be achieved.

In the liquid crystal display of the present embodiment, the material having the characteristic shown by the curve 31 or 32 in FIGS. 2 and 3 or the curve 34 or 35 in FIGS. 5 and 6 may be used for the anisotropic scattering layer. Further, in the present embodiment, a 240° twisted STN mode liquid crystal device has been used as the liquid crystal device, but a similar effect can also be obtained if a TN liquid crystal device with a twist angle of about 90° is used. When producing a large-screen display using a TN liquid crystal display device, it is preferable to construct it as an active-matrix reflective liquid crystal display using active devices such as TFTs or MIMs.

Further, if the optical compensating element is constructed using one retardation film, as in the third embodiment, or a plurality of retardation films, a similar effect can be obtained.

EMBODIMENT 5

Figure 17:
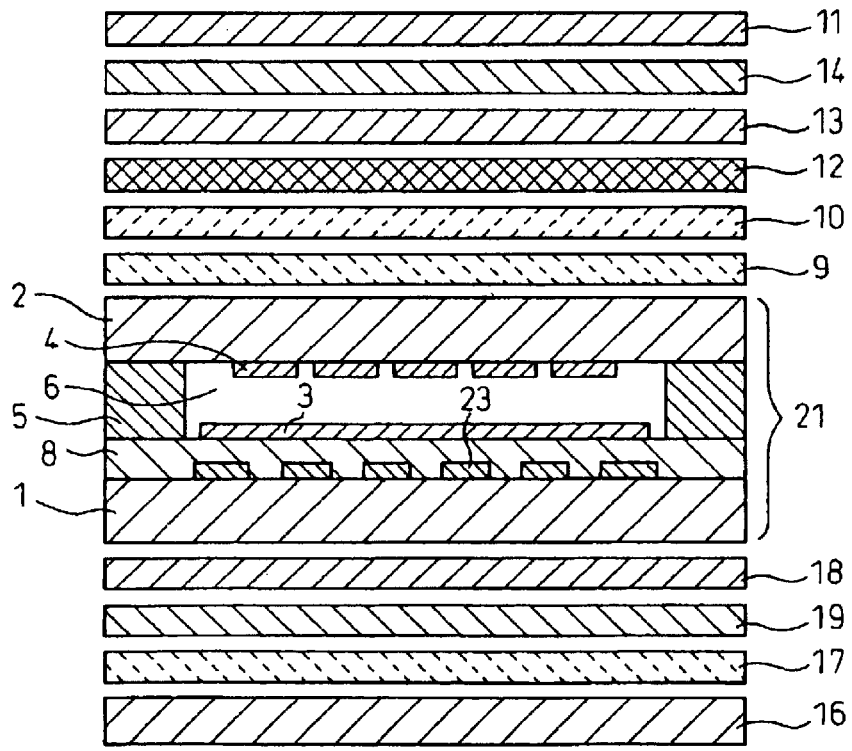
FIG. 17 is a cross-sectional view showing the configuration of a liquid crystal display according to the present invention.
Figure 18:
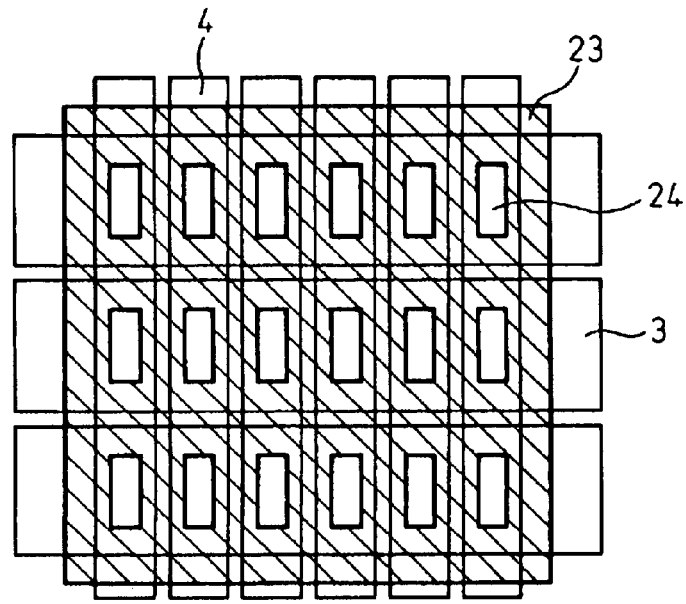
FIG. 18 is an enlarged plan view showing a pixel section of the liquid crystal display according to the present invention.
Figure 19:
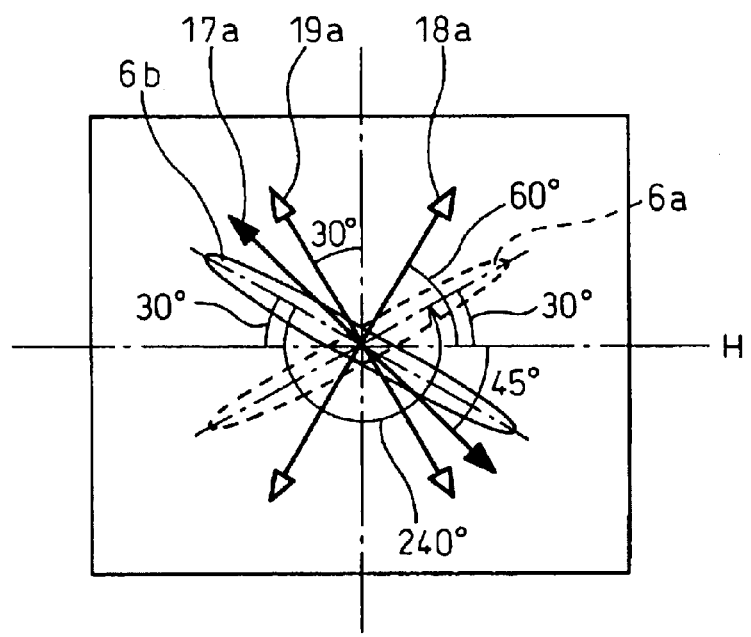
FIG. 19 is a plan view showing the relative orientations of the component elements of the liquid crystal display according to the present invention.
Figure 20:
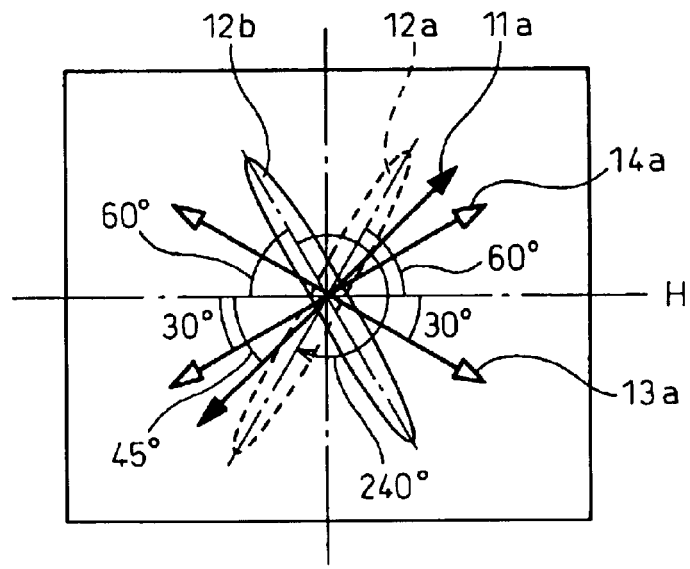
FIG. 20 is a plan view showing the relative orientations of the component elements of the liquid crystal display according to the present invention.

Next, the configuration of a liquid crystal display device according to a fifth embodiment will be described with reference to FIGS. 17, 18, 19, and 20. FIG. 17 is a cross-sectional view for explaining the component elements of the liquid crystal display according to the present embodiment, FIG. 18 is an enlarged plan view showing a pixel section, and FIGS. 19 and 20 are plan views showing the relative orientations of the various component elements.

As shown in FIG. 17, in the liquid crystal display of the present invention, a scattering layer 9, an anisotropic scattering layer 10, a twisted retardation film 12, a first retardation film 13, a second retardation film 14, and a top polarizer 11 are provided above a liquid crystal device 21. Underneath the liquid crystal device 21 are provided a third retardation film 18, a fourth retardation film 19, a bottom polarizer 17, and a backlight 16. In the present embodiment, a first optical compensating element is constructed using three retardation films, i.e., the twisted retardation film 12, the first retardation film 13, and the second retardation film 14, and a second optical compensating element is constructed using the third retardation film 18 and fourth retardation film 19.

The top polarizer 11, the second retardation film 14, the first retardation film 13, the twisted retardation film 12, and the anisotropic scattering layer 10 are laminated together using an acrylic adhesive. The liquid crystal device 21 is bonded to the above structure using a scattering adhesive layer formed as the scattering layer 9. The bottom polarizer 17, the fourth retardation film 19, and the third retardation film 18 are laminated together using an acrylic adhesive, and this laminated structure is bonded to the liquid crystal device 21 using an acrylic adhesive.

The liquid crystal device 21 comprises: a first substrate 1 formed from a 0.5-mm thick glass plate on which are formed a 0.1-μm transflective layer 23 made of aluminum, a 2-μm thick protective film 8 made of an acrylic material, and a 0.3-μm thick first electrode array 3 made of ITO which is a transparent electrode material; a second substrate 2 formed from a 0.5-mm thick glass plate on which is formed a 0.05-μm thick second electrode array 4 made of ITO; a seal member 5 for bonding the first and second substrates 1 and 2 together; and a nematic liquid crystal material 6 with left-handed 240° twisted orientation sandwiched between the first and second substrates 1 and 2.

As shown in FIG. 18, pixels are formed at the intersections of the first electrodes 3 and second electrodes 4, and the transflective layer 23 of a rectangular shape is formed over the pixel section. Openings 24, one for each pixel, are formed in the transflective layer 23 by photolithography. The transflective layer 23 is a completely reflecting layer except the opening portions thereof, and the transmittance and reflectance can be adjusted by adjusting the opening area size. In the present embodiment, the opening area is set to 30% of the pixel area, so that about 30% of light is transmitted and the remaining 70% is reflected.

Materials for the top polarizer 11, the scattering layer 9, and the anisotropic scattering layer 10 are the same as those used in the fourth embodiment shown in FIG. 16.

The twisted retardation film 12 is formed in the following manner. A liquid crystalline polymer having a twisted structure is applied onto a triacetylcellulose (TAC) film or a polyethylene terephthalate (PET) film after treating for alignment, is changed into a liquid crystal state by heating to a temperature of about 150° C. and, after adjusting the twist angle, is rapidly cooled to room temperature thereby fixing the twisted state.

Alternatively, a separately prepared film is treated for alignment and, after fixing the twisted state, the liquid crystalline polymer is transferred to a TAC film; in the present embodiment, a right-handed twisted retardation film having a twist angle Tc=−240° and exhibiting birefringence of Δnd value Rc=0.80 μm is used as the twisted retardation film 12.

The first retardation film 13 is a transparent film about 70 μm in thickness formed by stretching polycarbonate (PC), and its phase difference value F1 is 0.14 μm, i.e., one quarter wavelength, when the wavelength is 0.55 μm. The second retardation film 14 is also a transparent film about 70 μm in thickness formed by stretching PC, and its phase difference value F2 is set to 0.28 μm, i.e., one half wavelength, when the wavelength is 0.55 μm.

The third retardation film 18 is a transparent film about 70 μm in thickness formed by stretching PC, and its phase difference value F3 is 0.14 μm, i.e., one quarter wavelength, when the wavelength is 0.55 μm. The fourth retardation film 19 is also a transparent film about 70 μm in thickness formed by stretching PC, and its phase difference value F4 is set to 0.28 μm, i.e., one half wavelength, when the wavelength is 0.55 μm.

Next, the relative orientations of the various component elements will be explained with reference to FIGS. 19 and 20. As shown in FIG. 19, the first substrate 1 is rubbed in a direction 30° upward and to the right relative to the horizontal axis H, so that the molecular alignment direction of the bottom liquid crystal, 6a, is +30°. On the other hand, the second substrate 2 is rubbed in a direction 30° downward and to the right, so that the molecular alignment direction of the top liquid crystal, 6b, is −30°. A chiral material, a material having a helical structure, is added to a nematic liquid crystal with viscosity of 20 cp, and the helical pitch P is adjusted to 11 μm, thereby forming the liquid crystal device 21 of a left-handed twisted STN mode having a twist angle Ts=240°.

The reflective index difference Δn of the nematic liquid crystal 6 used is 0.15, and the cell gap, d, between the first substrate 1 and the second substrate 2 is set to 5.6 μm. Accordingly, the Δnd valve Rs, representing the birefringence of the liquid crystal device 21 and given by the product of the reflective index difference Δn of the nematic liquid crystal 6 and the cell gap d, is 0.84 μm.

As shown in FIG. 20, the transmission axis 11a of the top polarizer is oriented +45° relative to the horizontal axis H. The bottom molecular alignment 12a of the twisted retardation film 12 is oriented +60° relative to the horizontal axis H, and the top molecular alignment 12b is oriented −60° relative to the horizontal axis H, as shown in FIG. 20. Therefore, the right-handed rotational twist angle Tc is 240°, and the absolute difference between the twist angles is ΔT=Ts−Tc=0°, which is approximately equal to the birefringence difference ΔR=Rs−Rc=0.04 μm.

The delay axis 13a of the first retardation film is oriented −30° relative to the horizontal axis H, while the delay axis 14a of the second retardation film is oriented +30° relative to the horizontal axis H. The delay axis 18a of the third retardation film formed under the liquid crystal device 21 is oriented +60° relative to the horizontal axis H, the delay axis 19a of the fourth retardation film is oriented −60° relative to the horizontal axis H, and the transmission axis 17a of the bottom polarizer is oriented −45° relative to the horizontal axis H, that is, at right angles to the transmission axis 11a of the top polarizer.

The backlight 16 may be constructed using an electroluminescent (EL) plate or a fluorescent tube or LED mounted on a light conducting plate; in the present embodiment, an EL plate with white luminescent color, about 1 mm in thickness, is used.

Next, the operation of the liquid crystal display of the present embodiment will be described with reference to the drawing. First, the reflective display mode will be described. In the fourth embodiment, the optical compensating element was constructing using a single retardation film, but in the present embodiment, the optical compensating element is constructing using three retardation films, i.e., the twisted retardation film 12, the first retardation film 13, and the second retardation film 14.

The twist angle Tc and the Δnd value Rc of the twisted retardation film 12 are chosen to be approximately equal to the twist angle Ts and Δnd value Rs of the liquid crystal device 21. Further, since the twisted retardation film 12 is oriented at right angles to the liquid crystal molecules, as shown in FIG. 20, the birefringence occurring in the liquid crystal device 21 is completely compensated for, and the birefringence is thus eliminated.

In actuality, since the tilt angle of the nematic liquid crystal material 6 in the liquid crystal device 21 is greater than the tilt angle of the twisted retardation film 12, it is preferable to make the Δnd value Rc of the twisted retardation film slightly smaller than the Δnd value Rs of the liquid crystal device 21, because the birefringence can then be perfectly compensated for. It is more preferable if the wavelength dependence of the refractive index of the nematic liquid crystal material 6 is made to match the wavelength dependence of the refractive index of the liquid crystal polymer molecules in the twisted retardation film 12.

Even when the twist angle Tc of the twisted retardation film 12 differs from the twist angle Ts of the liquid crystal device 21, some degree of compensation can be accomplished. It was found by experiment that compensation could be accomplished when the twist angle Tc of the twisted retardation film 12 was set within a range of ±20° of the twist angle Ts of the liquid crystal device 21, and that the best compensation result was obtained when Tc=Ts as set in the configuration of the present embodiment. As for the orientation angle of the twisted retardation film 12, the birefringence of the liquid crystal device could be compensated for, as long as the angle was set within a range of ±20° of 90° with respect to the liquid crystal molecules.

The first retardation film 13, whose phase difference value F1 is 0.14 µm which is approximately equal to one quarter wavelength, and the second retardation film 14, whose phase difference value F2 is 0.28 µm which is approximately equal to one half wavelength, are placed one on top of the other with their axes oriented at 60°; in this case, the combined phase difference value of the two films for wavelength 0.55 µm is 0.14 µm, but the phase difference value becomes smaller than 0.14 µm at shorter wavelengths near 0.4 µm, and larger than 0.14 µm at longer wavelengths near 0.7 µm. The effective delay axis of the two films combined is parallel to the horizontal axis.

That is, using the two retardation films, it becomes possible to construct a so-called wideband quarter wave plate whose phase difference value is smaller at shorter wavelengths than at longer wavelengths. In other words, the F/λ value, i.e., the phase difference value F divided by the wavelength λ, can be made approximately equal to ¼ over the entire visible light range. Accordingly, with the structure comprising the polarizer, wideband quarter wave plate, and reflector arranged in this order from the top, the linearly polarized light passed through the polarizer is converted into circularly polarized light by passing through the quarter wave plate, reflected by the reflector, and passed again through the quarter wave plate where the light is converted back to linearly polarized light with its polarization direction rotated 90°; the linearly polarized light is then absorbed by the polarizer, thus creating a completely dark display.

In FIG. 17, the linearly polarized light passed through the top polarizer 11 is converted into circularly polarized light for all wavelengths in the visible region by passing through the second retardation film 14 and the first retardation film 13. Since the twisted retardation film 12 and the liquid crystal device 21 are completely compensated relative to each other, the polarization state does not change. Since the anisotropic scattering layer 10 and the scattering layer 9 are both formed from a material that has nearly zero retardation value and does not cause a change in the polarization state, the circularly polarized light reaches the transflective layer 23 without changing its polarization state.

The circularly polarized light reflected by the transflective layer 23 passes through the liquid crystal device 21 and twisted retardation film 12 without changing its polarization state but, by passing through the first retardation film 13 and second retardation film 14, the circularly polarized light is converted back to linearly polarized light with its polarization direction rotated 90°, and the linearly polarized light is absorbed by the top polarizer 11, thus creating a completely dark display.

Since the anisotropic scattering layer 10 and the scattering layer 9 are both formed from a material that has nearly zero phase difference value and does not easily cause a change in the polarization state, they may be placed anywhere between the second substrate 2 and the first substrate 1 or on the surface of the top polarizer 11, but it is preferable to place them as close as possible to the second substrate 2 in order to reduce image blurring. It is also preferable to make the second substrate 2 as thin as possible since it can then reduce image blurring; for this reason, a substrate thickness of 0.5 mm is chosen in the present embodiment. It is also possible to reduce the thickness of the second substrate to 0.4 mm, thus making it thinner than the first substrate whose thickness is 0.5 mm.

Next, when a voltage is applied between a pair of first and second electrode 3 and 4, the molecules in the liquid crystal 6 stand up, and the effective Δnd value of the liquid crystal device 21 decreases. As a result, though the linearly polarized light passed through the top polarizer 11 is converted into circularly polarized light by passing through the second retardation film 14 and first retardation film 13, the light is converted back to elliptically polarized light or linearly polarized light by passing through the twisted retardation film 12 and liquid crystal device 21.

If the birefringence occurring in the liquid crystal device 21 due to the voltage application is set approximately equal to one quarter wavelength, the linearly polarized light allowed to pass through the top polarizer 11 is returned unchanged to it without undergoing rotation, and a bright white display can thus be obtained.

In this way, by using the twisted retardation film 12, the first retardation film 13, and the second retardation film 14, higher contrast can be achieved than has been achieved by the liquid crystal display of the fourth embodiment. Further, with the provision of the anisotropic scattering layer 10 and the scattering layer 9, incident light incident at any angle can be intensely reflected into the viewing direction 45, and a bright and high-contrast reflective display can thus be achieved.

Next, the transmissive display mode when the backlight 16 is on will be described. The third retardation film 18 and the fourth retardation film 19 together constitute a wideband quarter wave plate, and its effective delay axis is oriented in a vertical direction, i.e., at 90° relative to the horizontal axis H.

Light emitted from the backlight 16 is linearly polarized by the bottom polarizer 17. since this linearly polarized light is incident at an angle of 45° with respect to the effective delay axis of the combined structure of the third retardation film 18 and fourth retardation film 19, it emerges as circularly polarized light. The transflective layer 23 reflects about 70% of the incident light and allows the remaining 30% to pass through it.

When no voltage is applied across the liquid crystal device 21, the circularly polarized light reaches the first retardation film 13 and second retardation film 14 without changing its polarization state, since the twisted retardation film 12 and the liquid crystal device 21 are completely compensated relative to each other. When the component elements are oriented as shown in FIGS. 19 and 20, the phase difference occurring through the third and fourth retardation films 18 and 19 is offset by the phase difference occurring through the first and second retardation films 13 and 14, and the light emerges from the latter as linearly polarized light polarized in the same direction as the light that passed through the bottom polarizer 17. Since the transmission axis 11a of the top polarizer is oriented at right angles to the transmission axis 17a of the bottom polarizer, the emergent light is blocked by the top polarizer, thus creating a black display state.

Next, when a voltage is applied between a pair of first and second electrode 3 and 4, the molecules in the liquid crystal 6 stand up, and the effective Δnd value of the liquid crystal device 21 decreases. As a result, though the linearly polarized light passed through the bottom polarizer 17 is converted into circularly polarized light by passing through the third retardation film 18 and fourth retardation film 19, the light is converted back to elliptically polarized light or linearly polarized light by passing through the liquid crystal device 21 and twisted retardation film 12.

If the birefringence occurring in the liquid crystal device 21 due to the voltage application is set approximately equal to one quarter wavelength, the linearly polarized light passed through the bottom polarizer 17 is rotated 90° by passing through the first retardation film 13 and second retardation film 14, and is thus allowed to pass through the top polarizer 11, producing a good white display state.

In this way, with the provision of the top polarizer 11, the second retardation film 14, the first retardation film 13, the twisted retardation film 12, the anisotropic scattering layer 10, the scattering layer 9, and the liquid crystal device 21 incorporating the transflective layer 23, a high-contrast display with a good viewing angle characteristic can be obtained in the reflective display mode that uses ambient light, and with the provision of the third retardation film 18, fourth retardation film 19, bottom polarizer 17, and backlight 16 under the liquid crystal device 21, a single-polarizer transflective liquid crystal display apparatus can be obtained that can produce a display with good contrast by turning on the backlight 16 in an environment where sufficient ambient light is not available.

Further, with the provision of the transflective layer 23 formed with openings 24 one for each pixel, the display can be adapted to a mostly transmissive liquid crystal display by increasing the area of the openings 24 or to a mostly reflective liquid crystal display by reducing the area of the openings 24.

In the present embodiment, a retardation film, produced by monoaxially stretching PC and having the characteristic that the refractive index nz in the Z-axis direction is related to the refractive index nx in the stretching direction and the refractive index ny in the perpendicular direction such that nx>ny=nz, has been used for each of the first and second retardation films 13 and 14; however, a similar effect can also be obtained if each retardation film is formed from a so-called Z-type retardation film produced by multi-axial stretching and having the relation nx>nz>ny, or from a retardation film produced by stretching polyvinyl alcohol (PVA), polypropylene (PP), or like material.

Further, the delay axis 13a of the first retardation film has been oriented at −30°, and the delay axis 14a of the second retardation film at +30°; however, if the delay axis 13a of the first retardation film is oriented at +30°, and the delay axis 14a of the second retardation film at −30°, the same effect can be obtained as long as they are oriented at 60° relative to each other.

Likewise, the delay axis 18a of the third retardation film has been oriented at +60°, and the delay axis 19a of the fourth retardation film at −60°; however, if the delay axis 18a of the third retardation film is oriented at −60°, and the delay axis 19a of the fourth retardation film at +60°, the same effect can be obtained as long as they are oriented at 60° relative to each other.

The second optical compensating element has been described as being constructed using two retardation films, i.e., the third retardation film 18 and the fourth retardation film 18, formed on the lower side of the liquid crystal device 21, but the second optical compensating element may be constructed using only the third retardation film 18 whose phase difference value is one quarter wavelength; in that case also, a similar effect can be obtained, though the contrast of the transmissive display somewhat decreases. It is also possible to use an optical compensating element constructed from a twisted retardation film, etc.

Further, the optical compensating element has been described as being constructed using three retardation films, i.e., the twisted retardation film 12, the first retardation film 13, and the second retardation film 14, but the optical compensating element may be constructing using only one twisted retardation film 12 or using the twisted retardation film 12 and one retardation film.

When a liquid crystal display was constructed by using the same liquid crystal device 21 as used in the fifth embodiment and by arranging outside the liquid crystal device 21 the scattering layer 9, the anisotropic scattering layer 10, the twisted retardation film 12 with a twist angle of 180° and a Δnd value Rc=0.68 μm, and the top polarizer 11 with its transmission axis 11a oriented at −55° relative to the horizontal axis H, a bright and high-contrast display was obtained.

Further, when a liquid crystal display was constructed by using the same liquid crystal device 21 as used in the present embodiment and by arranging outside the liquid crystal device 21 the scattering layer 9, the anisotropic scattering layer 10, the twisted retardation film 12 with a twist angle of 220° and Δnd value Rc=0.60 μm, the first retardation film 13 with the phase difference value F1=0.63 μm, and the top polarizer 11 with its transmission axis 11a oriented at 70° relative to the horizontal axis H, a bright and high-contrast display could likewise be achieved.

The liquid crystal display configuration having the backlight of the present embodiment can also be applied to any one of the liquid crystal displays of the first to fourth embodiments.

EMBODIMENT 6

Figure 21:
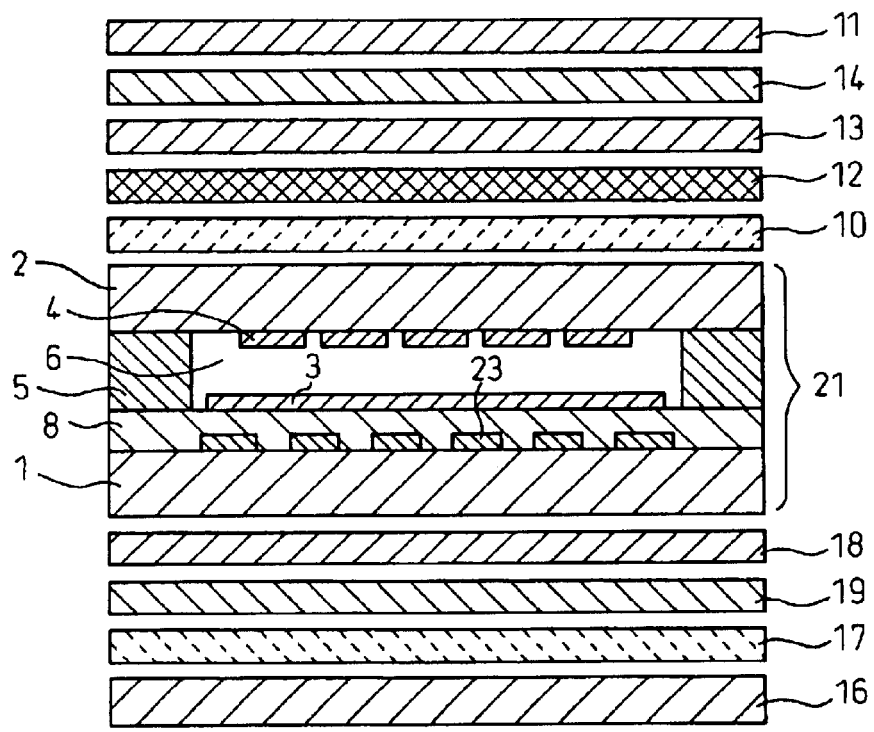
FIG. 21 is a cross-sectional view showing the configuration of a liquid crystal display according to the present invention.

FIG. 21 is a diagram showing the configuration of a liquid crystal display according to a sixth embodiment. The liquid crystal display shown in FIG. 21 is the same in configuration as the liquid crystal display of the fifth embodiment shown in FIG. 17, except that the scattering layer 9 is omitted. If the scattering layer is omitted and only the anisotropic scattering layer 10 is used as in this embodiment, a high-contrast liquid crystal display with a good viewing angle characteristic can be achieved.

In that case, the material having the characteristic shown by the curve 34 in FIGS. 5 and 6 is used for the anisotropic scattering layer 10.

Alternatively, the anisotropic scattering layer having the characteristic of high scattering performance shown by the curve 35 in FIGS. 5 and 6 may be used as the anisotropic scattering layer 10.

It is also possible to use the material having the characteristic shown by the curve 31 or 32 in FIGS. 2 and 3.

EMBODIMENT 7

Figure 22:
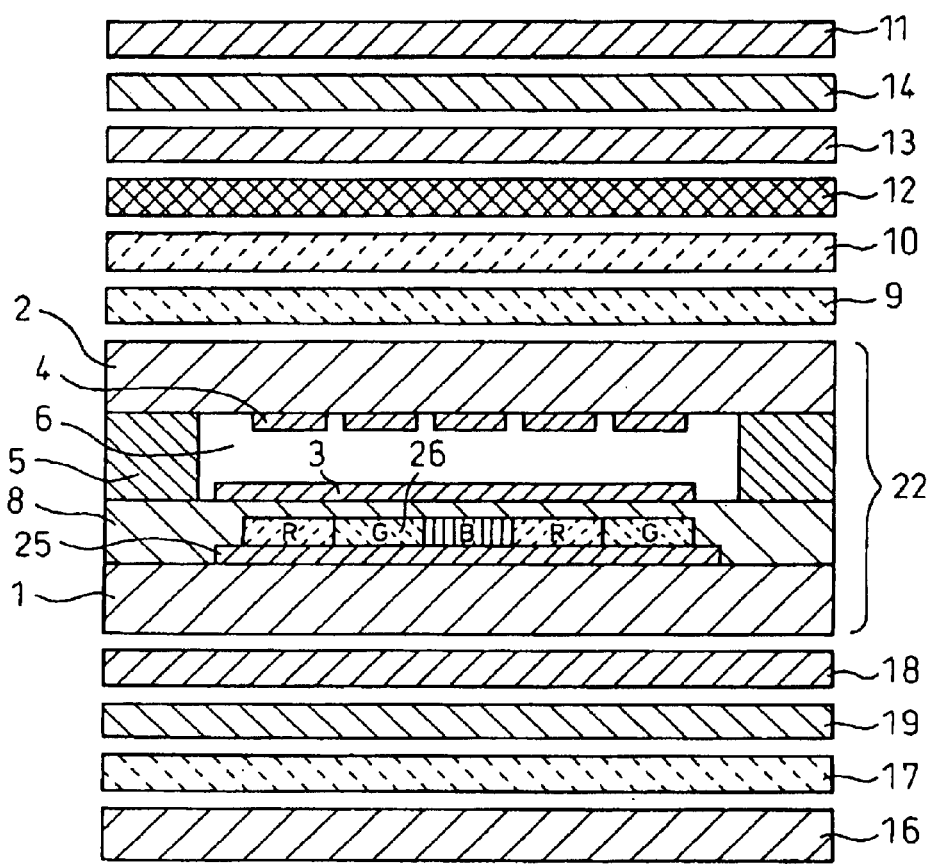
FIG. 22 is a cross-sectional view showing the configuration of a liquid crystal display according to the present invention.
Figure 23:
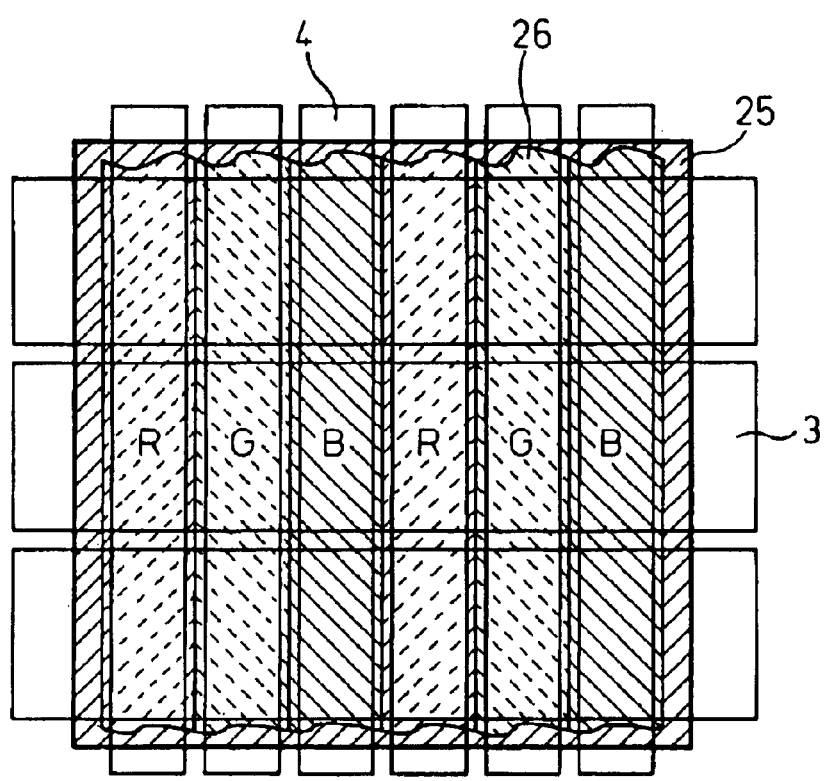
FIG. 23 is an enlarged plan view showing a pixel section of the liquid crystal display according to the present invention.

Next, the configuration of a liquid crystal display according to a seventh embodiment will be described with reference to FIGS. 22 and 23. FIG. 22 is a cross-sectional view for explaining the component elements of the liquid crystal display of the seventh embodiment, and FIG. 23 is an enlarged plan view showing a pixel section. The relative orientations of the various component elements are the same as those shown in FIGS. 19 and 20.

As shown in FIG. 22, the liquid crystal display of the present invention comprises: a liquid crystal device 22; a structure provided above the liquid crystal device 22, consisting essentially of a scattering layer 9, an anisotropic scattering layer 10, a twisted retardation film 12, a first retardation film 13, a second retardation film 14, and a top polarizer 11; and a structure provided under the liquid crystal device 22, consisting essentially of a third retardation film 18, a fourth retardation film 19, a bottom polarizer 17, and a backlight 16. In this embodiment also, the optical compensating element is constructed using three retardation films, i.e., the twisted retardation film 12, the first retardation film 13, and the second retardation film 14. A second optical compensating element is constructed using the third retardation film 18 and the fourth retardation film 19.

Here, the material having the characteristic shown by the curve 34 or 35 in FIGS. 5 and 6 is used for the anisotropic scattering layer 10. Alternatively, the material having the characteristic shown by the curve 31 or 32 in FIGS. 2 and 3 may be used for the anisotropic scattering layer.

The top polarizer 11, the second retardation film 14, the first retardation film 13, the twisted film 12, and the anisotropic scattering layer 10 are laminated together using an acrylic adhesive. The liquid crystal device 22 is bonded to the above structure using a scattering adhesive layer formed as the scattering layer 9. The bottom polarizer 17, the fourth retardation film 19, and the third retardation film 18 are laminated together using an acrylic adhesive, and the liquid crystal device 22 is also bonded using an acrylic adhesive.

The liquid crystal device 22 comprises: a first substrate 1 formed from a 0.5-mm thick glass plate on which are formed a 0.02-$\mu$m transflective layer 25 made of aluminum, a 1-$\mu$m thick color filter of three colors consisting of a red filter R, a green filter G, and a blue filter B, a 2-$\mu$m thick protective film 8 made of an acrylic material, and a 0.3-$\mu$m thick first electrode array 3 made of ITO which is a transparent electrode material; a second substrate 2 formed from a 0.5-mm thick glass plate on which is formed a 0.05-$\mu$m thick second electrode array 4 made of ITO; a seal member 5 for bonding the first and second substrates 1 and 2 together; and a nematic liquid crystal material 6 with left-handed 240° twisted orientation sandwiched between the first and second substrates 1 and 2.

The transflective layer 25 is formed from a very thin aluminum film which acts as a so-called half-silvered mirror that transmits part of incident light and reflects the remaining part. In the present embodiment, with the aluminum thin film deposited to a thickness of 0.02 $\mu$m, the transflective layer 25 transmits about 20% of incident light and reflects the remaining 80%, and is formed in a rectangular shape over the pixel section as shown in FIG. 23.

The top polarizer 11, the twisted retardation film 12, the first retardation film 13, the second retardation film 14, the scattering layer 9, and the anisotropic scattering layer 10 are the same as those used in the fifth embodiment, and the bottom polarizer 17, the third retardation film 18, and the fourth retardation film 19 are also the same as those used in the fifth embodiment.

For the backlight 16, the same white EL as used in the fifth embodiment may also be used here, but in the present embodiment, a side-lighting type with a three-band fluorescent tube mounted on a light conducting plate is used in order to enhance the chroma and brightness performance.

The color filter 26 consists of three color filters, i.e., the red, green, and blue filters, and in the present embodiment, the filters are formed in vertical stripe patterns parallel to the second electrodes 4, as shown in FIG. 23. The width of each color filter is made larger than the width of each second electrode 4 so that no gaps are formed between the filters. If a gap is formed between filters, the amount of incident flux will increase, increasing the brightness of the display, but white light will be mixed into the display color and the color purity will degrade, which is not desirable.

It is desirable that the color filter 26 have as a high maximum spectral transmittance as possible for enhanced brightness; preferably, the maximum transmittance of each color is 80% or higher, and most preferably 90% or higher. Minimum straight-go transmittance also needs to be made high, that is, 20% to 50%.

For the color filter 26, various types of filter, such as pigment dispersion type, dye type, print type, transfer type, and electrodeposition type, can be used, of which the pigment dispersion type formed from an acrylic or PVA-based photosensitive resin with a pigment dispersed in it is the most preferable because of its high heat resisting temperature and good color purity.

To produce the color filter 26 having such a high transmittance, the transflective layer 25 was formed by depositing an aluminum thin film on the first substrate 1, a SiO2 film was formed to a thickness of 0.3 $\mu$m on the surface of the transflective layer 25, and a color resist formed from a photosensitive resin with 10 to 15% of pigment mixed therein was applied onto the first substrate 1, which was followed by exposure and developing steps, completing the fabrication of the color filter 26 having a thickness of about 1 $\mu$m and achieving high transmittance.

The relative orientations of the various component elements are the same as those shown in FIGS. 19 and 20.

The effect of the liquid crystal display of the present embodiment will be described with reference to drawing. Since the color filter 26 does not exhibit any birefringence, the operation of the reflective display mode is the same as that described in the fifth embodiment; that is, by using the twisted retardation film 12, first retardation film 13, and second retardation film 14, good contrast can be obtained, and by further using the scattering layer 9 and anisotropic scattering layer 10, a bright display with a good viewing angle characteristic can be achieved.

Color display can be achieved by combining the ON/OFF states of display pixels. For example, a red display state can be created by turning the red filter R on (light) and the green filter G and blue filter B off (dark).

Since the transflective liquid crystal display of the present embodiment provides high reflectance and a high contrast ratio of 10 or more, a bright color display of high chroma quality can be achieved even in the reflective display mode when the backlight 16 is off.

Next, the transmissive display mode when the backlight 16 is on will be described. Since neither the transflective layer 25 nor the color filter 26 exhibits birefringence, the operation of the transmissive display mode is the same as that described in the firth embodiment. That is, light emitted from the backlight 16 is linearly polarized by the bottom polarizer 17, and converted into circularly polarized light by passing through the fourth retardation film 19 and third retardation film 18. The transflective layer 25 reflects about 80% of incident light and allows the remaining 20% to pass through it.

When no voltage is applied across the liquid crystal device 22, since the twisted retardation film 12, the liquid crystal device 22, the first retardation film 13, and the second retardation film 14 combine to provide birefringence equivalent to one quarter wavelength over almost the entire wavelength range, the phase difference introduced through the third and fourth retardation films 18 and 19 is offset by the phase difference introduced through the liquid crystal device 22, twisted retardation film 12, and first and second retardation films 13 and 14, and the light emerges as linearly polarized light polarized in the same direction as the transmission axis 17a of the bottom polarizer.

Since the transmission axis 11a of the top polarizer is oriented at right angles to the transmission axis 17a of the bottom polarizer, the emergent light is blocked by the top polarizer, thus creating a black display state. Then, when a voltage is applied between a pair of first and second electrode 3 and 4, a white display state is created by the same effect as described in the fifth embodiment.

In this way, with the provision of the top polarizer 11, the second retardation film 14, the first retardation film 13, the twisted retardation film 12, the scattering layer 9, the anisotropic scattering layer 10, and the liquid crystal device 22 incorporating the transflective layer 23 and the color filter 26, a bright and high-contrast color display with a good viewing angle characteristic can be achieved in the reflective display mode that uses ambient light. On the other hand, with the provision of the third retardation film 18, fourth retardation film 19, bottom polarizer 17, and backlight 16 under the liquid crystal device 22, a good color display can be achieved by turning on the backlight 16 in an environment where sufficient ambient light is not available.

In the present embodiment, the color filter 26 has been formed on the first substrate 1, but it is also possible to form the color filter 26 between the second electrode array 4 and the inside surface of the second substrate 2. However, it is preferable to form the color filter 26 on the first substrate, since the protective film 8 can then provide a planarized top surface for the color filter 26 while, at the same time, serving as an insulating layer between the transflective layer 25 and the first electrode array 3.

Further, RGB three colors have been used for the color filter 26, but it will be appreciated that a bright color display can likewise be achieved if three color filters of cyan, yellow, and magenta are used.

The transflective layer 25 has been formed from a 0.02-μm thick aluminum thin film, but as long as the thickness is held within a range of 0.03 μm to 0.01 μm, the film can act as a half-silvered mirror that transmits part of incident light.

Also, the transflective layer 25 has been formed by depositing a SiO2 thin film on an aluminum thin film, but instead, an aluminum oxide film may be formed by anodic oxidation or, to improve reflectance, a multilayered film consisting of a plurality of inorganic films of different refractive indices may be formed on the aluminum thin film.

The optical compensating element has been constructed using three retardation films, i.e., the twisted retardation film 12, the first retardation film 13, and the second retardation film 14, but it may be constructed from a single retardation film, as in the first embodiment, or from a plurality of retardation films, or only one twisted retardation film 12, or one twisted retardation film and one retardation film; in either case, a liquid crystal display with a comparable color display quality can be achieved.

The liquid crystal display configuration using the color filter of the present embodiment can also be applied to any one of the liquid crystal displays of the first to sixth embodiments

EMBODIMENT 8

Next, the configuration of a liquid crystal display according to an eighth embodiment will be described below. The liquid crystal display of the eighth embodiment is the same in configuration as the liquid crystal display of the seventh embodiment, except that the scattering layer 9 is omitted.

Figure 24:
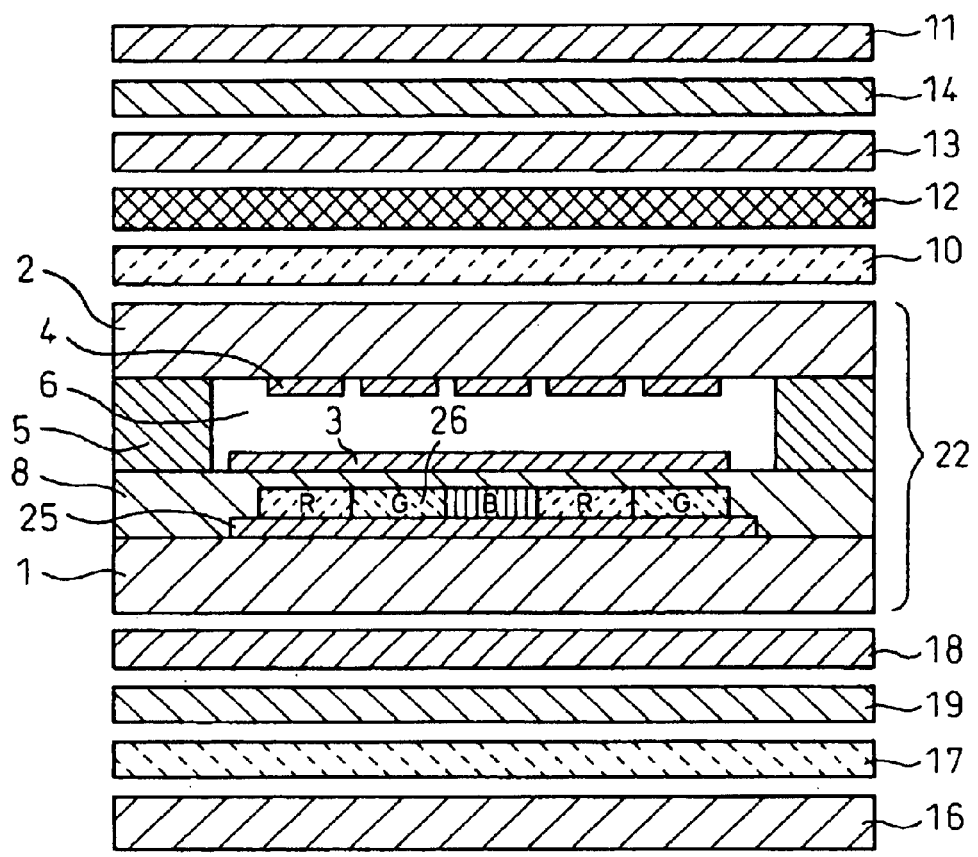
FIG. 24 is a cross-sectional view showing the configuration of a liquid crystal display according to the present invention.

The configuration of the liquid crystal display of the present embodiment will be described with reference to the drawing. FIG. 24 is a cross-sectional view for explaining the component elements of the liquid crystal display of the eighth embodiment according to the present invention. The configuration of the pixel section is the same as that shown in the enlarged view of FIG. 23, and the relative orientations of the various component elements are the same as those shown in FIGS. 19 and 20 and will not be described here in detail. The configuration of the liquid crystal display of the present invention will be described below with reference to FIGS. 23, 24, 19, and 20.

As shown in FIG. 24, the liquid crystal display of the present invention comprises: a liquid crystal device 22; a structure provided above the liquid crystal device 22, consisting essentially of an anisotropic scattering layer 10, a twisted retardation film 12, a first retardation film 13, a second retardation film 14, and a top polarizer 11; and a structure provided under the liquid crystal device 22, consisting essentially of a third retardation film 18, a fourth retardation film 19, a bottom polarizer 17, and a backlight 16. In this embodiment also, the optical compensating element is constructed using three retardation films, i.e., the twisted retardation film 12, the first retardation film 13, and the second retardation film 14, and the material having the characteristic shown by the curve 34 or 35 in FIGS. 5 and 6 is used for the anisotropic scattering layer. The second optical compensating element is constructed using the third retardation film 18 and the fourth retardation film 19.

Here, the material having the characteristic shown by the curve 34 or 35 in FIGS. 5 and 6 is used for the anisotropic scattering layer 10.

Alternatively, the material having the characteristic shown by the curve 31 or 32 in FIGS. 2 and 3 may be used for the anisotropic scattering layer 10.

The top polarizer 11, the second retardation film 14, the first retardation film 13, the twisted film 12, and the anisotropic scattering layer 10 are laminated together using an acrylic adhesive. The liquid crystal device 22 is bonded using an acrylic adhesive. The bottom polarizer 17, the fourth retardation film 19, and the third retardation film 18 are laminated together using an acrylic adhesive, and the liquid crystal device 22 is also bonded using an acrylic adhesive.

The configuration of the liquid crystal device 22 is the same as that of the sixth embodiment, and the transflective layer 25 is formed from a very thin aluminum film which acts as a so-called half-silvered mirror that transmits part of incident light and reflects the remaining part. In the present embodiment, with the aluminum thin film deposited to a thickness of 0.02 μm the transflective layer 25 transmits about 20% of incident light and reflects the remaining 80%, and is formed in a rectangular shape over the pixel section as shown in FIG. 18.

The top polarizer 11, the twisted retardation film 12, the first retardation film 13, the second retardation film 14, the bottom polarizer 17, the third retardation film 18, the fourth retardation film 19, and the backlight 16 are the same as those used in the sixth embodiment.

The relative orientations of the various component elements are the same as those shown in FIGS. 19 and 20, and therefore, will not be described here.

Next, the effect of the liquid crystal display of the eighth embodiment will be described. In the configuration of FIG. 22, the scattering layer 9 and anisotropic scattering layer 10 were provided between the liquid crystal device 22 and the twisted retardation film 12 but, in the present embodiment, the scattering layer 9 is omitted, and only the anisotropic scattering layer 10 is provided, as shown in FIG. 24.

Color display can be achieved by combining the ON/OFF states of display pixels; further, with the provision of the anisotropic scattering layer 10, light rays incident at angles of 20° to 50°, which are most frequently encountered in an ordinary use environment, can be intensely reflected in the layer normal direction, i.e, the viewing direction, enhancing the display brightness, and contrast also improves because of reduced back scattering. Because of the high degree of scattering in the layer normal direction, a bright color display can be achieved compared with the liquid crystal display of the third embodiment, though slight image blurring occurs.

The above effect of the anisotropic scattering layer 10 can also be obtained with a TN mode liquid crystal device having a twist angle of about 90°, but the effect of improving the viewing angle characteristic can be further enhanced particularly when the STN mode liquid crystal with a twist angle of 180° to 260° is used.

In the transmissive display mode with the backlight 16 ON, a good color display can also be achieved by the same effect as described in the third embodiment.

In this way, with the provision of the top polarizer 11, the second retardation film 14, the first retardation film 13, the twisted retardation film 12, the anisotropic scattering layer 10a, and the STN mode liquid crystal device 22 incorporating the transflective layer 9 and the color filter 26, a bright and high-contrast color display with a good viewing angle characteristic can be achieved in the reflective display mode that uses ambient light; further, with the provision of the third retardation film 18, fourth retardation film 19, bottom polarizer 17, and backlight 16 under the liquid crystal device 22, a single-polarizer liquid crystal display can be provided that is capable of achieving a good color display by turning on the backlight 16 in an environment where sufficient ambient light is not available.

What is claimed is:

1. A liquid crystal display comprising a first substrate having a reflective layer and a first electrode, a second substrate having a second electrode, and a nematic liquid crystal material with twisted orientation sandwiched between the first and second substrates, wherein the liquid crystal display includes an anisotropic scattering layer which is provided nearer to a viewing side than to the reflective layer, and whose straight-go transmittance varies depending on the incident angle, and when the viewing direction of the anisotropic scattering layer is designated as the Y-axis direction, and a direction orientated substantially at right angles to the Y-axis direction is designated as the X-axis direction, the anisotropic scattering light is provided with a part in which light entering the anisotropic scattering layer is scattered over a wider angle along the Y-axis direction than along the X-axis direction, and wherein the straight-go transmittance of the anisotropic scattering layer has an incident angle dependence that is symmetrical about a layer normal to the anisotropic scattering layer for both the X-axis direction and the Y-axis direction, the straight-go transmittance of the anisotropic scattering layer in the direction of the layer normal is lower than the straight-go transmittance thereof in any oblique direction, and maximum straight-go transmittance is substantially the same in value for both the X-axis direction and the Y-axis direction.

2. A liquid crystal display comprising a first substrate having a reflective layer and a first electrode, a second substrate having a second electrode, and a nematic liquid crystal material with twisted orientation sandwiched between the first and second substrates, wherein the liquid crystal display includes an anisotropic scattering layer which is provided nearer to a viewing side than to the reflective layer, and whose straight-go transmittance varies depending on the incident angle, and when the viewing direction of the anisotropic scattering layer is designated as the Y-axis direction, and a direction orientated substantially at right angles to the Y-axis direction is designated as the X-axis direction, the anisotropic scattering light is provided with a part in which light entering the anisotropic scattering layer is scattered over a wider angle along the Y-axis direction than along the X-axis direction, and wherein the straight-go transmittance of the anisotropic scattering layer has an incident angle dependence that is asymmetrical along the X-axis direction about a layer normal to the anisotropic scattering layer, and symmetrical along the Y-axis direction, and the straight-go transmittance of the anisotropic scattering layer in the direction of the layer normal is lower than the straight-go transmittance thereof in any oblique direction.

3. A liquid crystal display as claimed in claim 2, wherein the straight-go transmittance of the anisotropic scattering layer in oblique directions has a characteristic such that the maximum straight-go transmittance is higher for light rays obliquely incident along the X-axis direction than for light rays obliquely incident along the Y-axis direction.

4. A liquid crystal display as claimed in claim 1 or 2, wherein a scattering layer is provided in addition to the anisotropic scattering layer.

5. A liquid crystal display as claimed in claim 1 or 2, wherein the nematic liquid crystal material has a twist angle that lies within a range of 180° to 260°.

6. A liquid crystal display as claimed in claim 1 or 2, wherein the reflective layer is formed as a transflective layer, and a backlight is provided on the outside of the first substrate.

7. A liquid crystal display as claimed in claim 1 or 2, wherein a color filter consisting of a plurality of colors is provided on either one of the first and second substrates.

8. A liquid crystal display as claimed in claim 1 or 2, wherein at least one optical compensating element is provided on the second substrate side, and the optical compensating element is constructed using a retardation film or a twisted retardation film or both.

\* \* \* \* \*